United States Patent [19]

Cody et al.

[11] Patent Number: 5,218,871
[45] Date of Patent: Jun. 15, 1993

[54] NON-INTRUSIVE LIQUID FLOW METER FOR LIQUID COMPONENT OF TWO PHASE FLOW BASED ON SOLID OR FLUID BORNE SOUND (C-2408)

[75] Inventors: George D. Cody, Princeton, N.J.; Charles L. Baker, Jr., Thornton, Pa.; Gerald V. Storch, Jr., Bridgewater, N.J.

[73] Assignee: Exxon Research and Engineering Company, Florham Park, N.J.

[21] Appl. No.: 718,458

[22] Filed: Jun. 20, 1991

[51] Int. Cl.$^5$ .............................................. G01F 1/74
[52] U.S. Cl. ............................... 73/861.04; 73/861.18
[58] Field of Search ............ 73/861.04, 861.18, 861.21

[56] References Cited

U.S. PATENT DOCUMENTS

| | | | |
|---|---|---|---|
| 4,884,457 | 12/1989 | Hatton | 73/861.04 |
| 4,905,897 | 3/1990 | Rogers et al. | 73/861.18 X |
| 4,989,158 | 1/1991 | Sloane | 73/664 X |
| 5,031,466 | 7/1991 | Redus | 73/961.04 |

Primary Examiner—Herbert Goldstein
Assistant Examiner—Elizabeth L. Shopbell
Attorney, Agent, or Firm—Ronald D. Hantman

[57] ABSTRACT

A method for measuring the mass flow rate of liquid flow exiting a two phase (gas/liquid) feed nozzle. The method includes determining the Power Spectral Density from the output of a vibrational sensor (accelerometer or dynamic pressure sensor) in close proximity to the nozzle or in contact with the fluid within the nozzle in a frequency band that includes resonant peaks whose magnitude or area is strongly dependent on the mass flow rate of the liquid and which increases as the flow increases. Measurement of the area of the resonant peaks or of a band of frequencies that includes them can be correlated with the liquid flow and is insensitive to the gas flow.

11 Claims, 21 Drawing Sheets

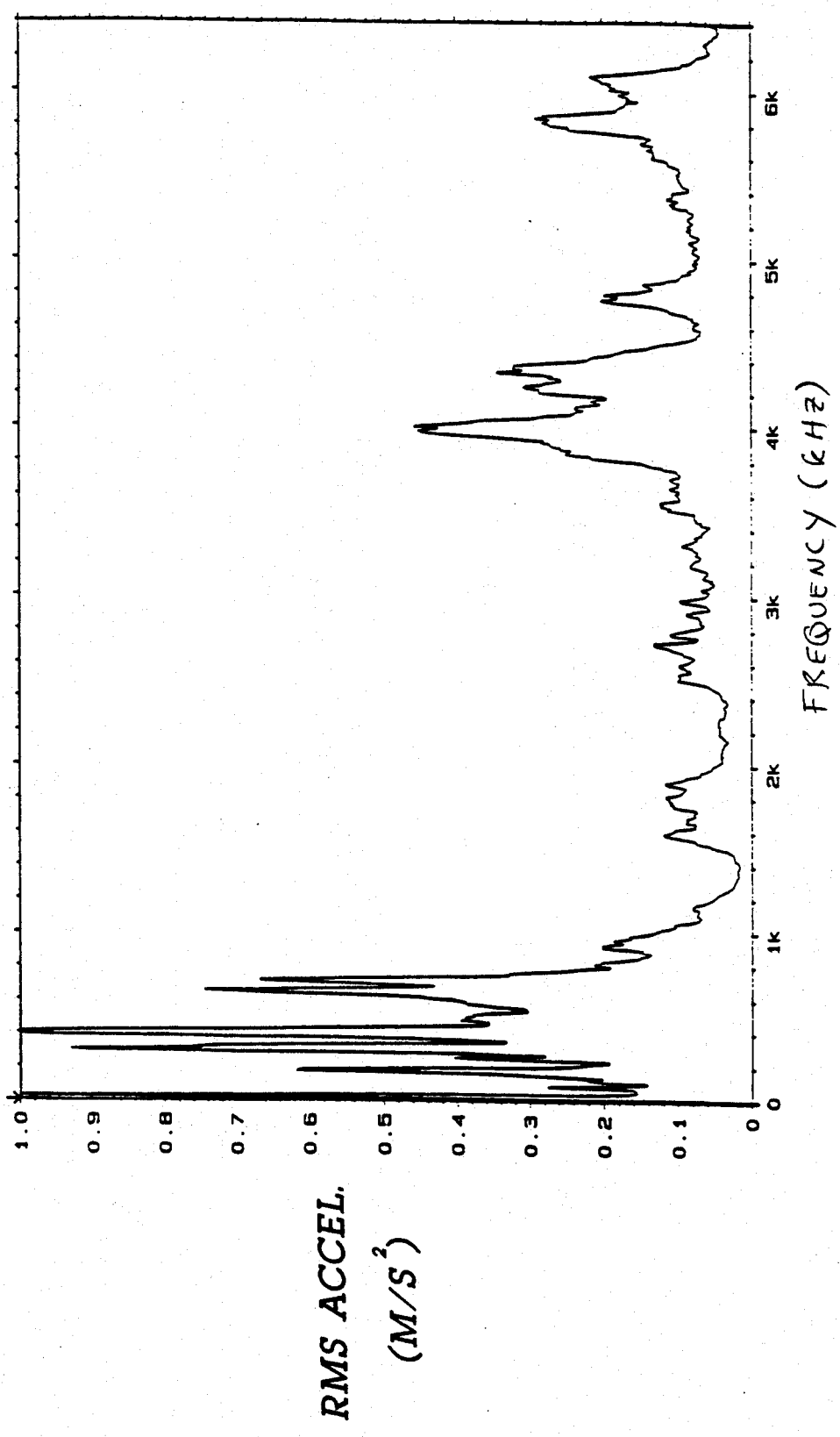

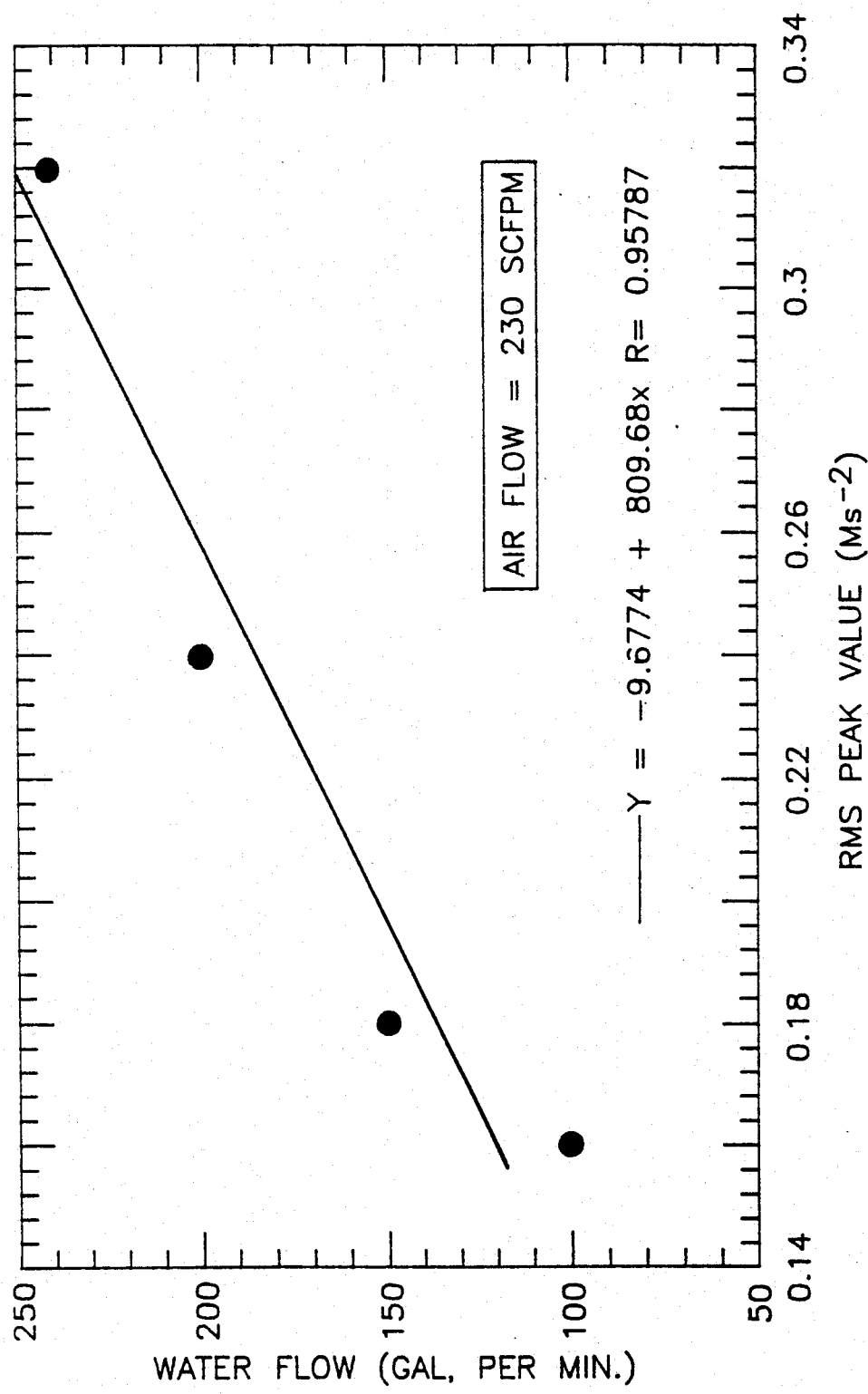

FIG. 8A
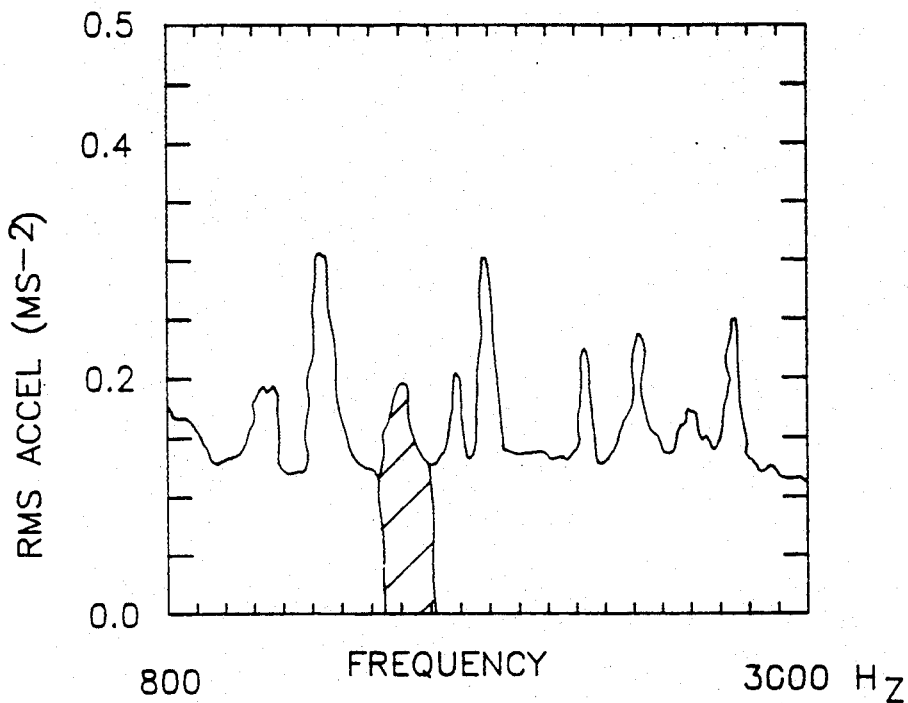
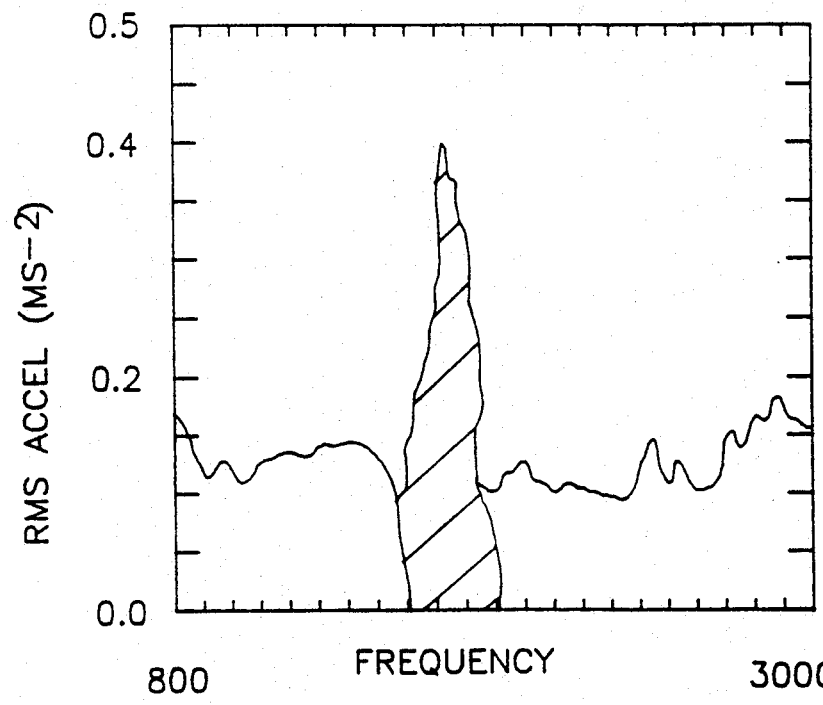
FIG.8B

FIG. 8C
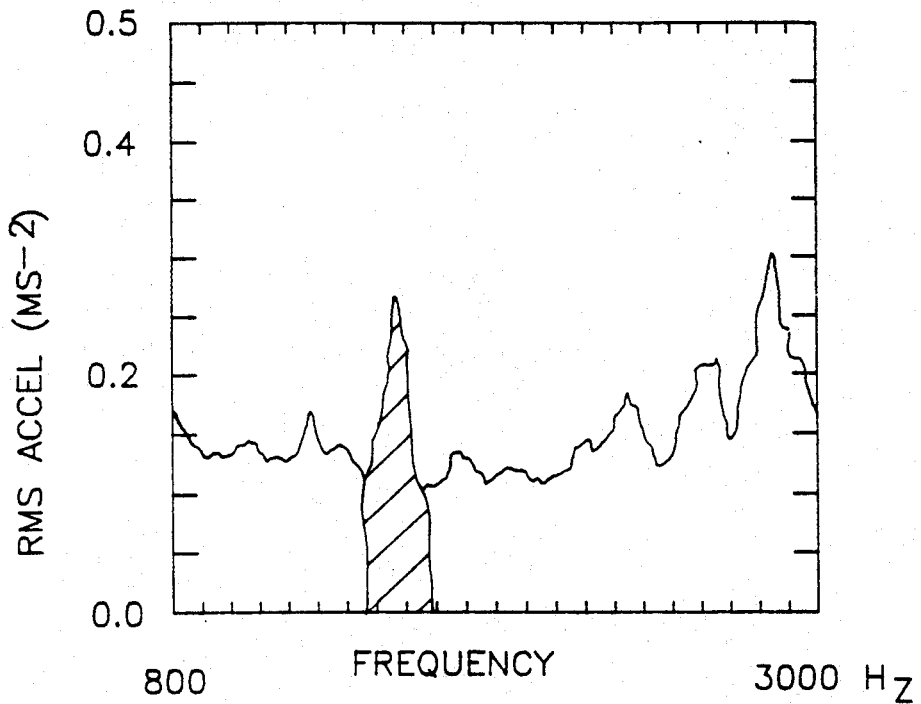
OIL VALVE 33% OPEN
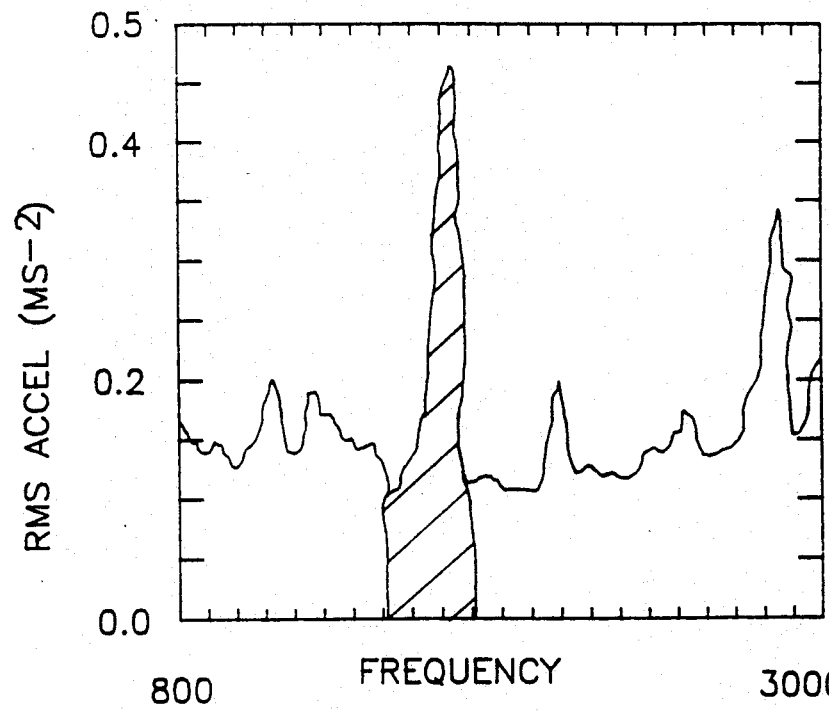
OIL VALVE 58% OPEN
FIG. 8D

NON-INTRUSIVE LIQUID FLOW METER FOR LIQUID COMPONENT OF TWO PHASE FLOW BASED ON SOLID OR FLUID BORNE SOUND (C-2408)

BACKGROUND OF THE INVENTION

The present invention describes a method for measuring the mass flow rate of liquid flow in a two phase (gas/liquid) feed nozzle.

Two phase nozzles are important for a variety of applications particularly for the injection of atomized feed in chemical or petroleum processing operations. In many such processes, operability or selectivity improvements result when an atomized hydrocarbon liquid is sprayed in a controlled and measured manner into a reaction zone, particularly when a process catalyst is involved. One example is the process of fluidized catalytic cracking (FCC) of higher boiling petroleum fractions. Typically, a high degree of feed atomization is achieved by mixing the liquid feed with a gas and injecting the mixture into the process from a feed nozzle designed to produce finely dispersed drops. In catalytic cracking, steam is typically used as the atomizing gas, but any process compatible gas may be used.

The need to control and measure the distribution of the atomized liquid sprayed into a process vessel is normally satisfied by using multiple services or nozzles. Maintaining the proper mixture of liquid to gas for atomization, and ensuring that each nozzle carries a specified liquid or mass flow, enables potential unit operating advantages. One common operating mode is to maintain equal liquid flow in each nozzle. Most installations which have multiple feed nozzles usually include block valves or restriction orifices on the liquid and gas lines to each individual nozzle, but these do not uniquely determine the liquid flow. When nozzles are fed from a common manifold, there is no assurance that the liquid flow through each nozzle is optimized since only the net liquid flow to the total manifold can be readily measured. In fact, measurement of various manifolded nozzle flows has usually shown significant deviations from equal liquid flow to each nozzle. In contrast the gas flow to a nozzle is usually determined by a restriction orifice on the gas line which ensures relatively uniform gas distribution to the individual nozzles.

Measuring mass flow of a liquid is not new. There are a variety of flow meters that have been used to measure mass flow. Some of them are mechanical in nature utilizing the force of a moving liquid to turn a wheel or deflect a needle. Such flow meters can only measure mass flow in single phase conditions and are usually restricted to non-fouling liquids. Those flow meters available for the single phase flows common to the petroleum and petrochemical industry tend to be quite costly. The very high temperatures that are maintained to reduce flow viscosity impose yet other complications. Furthermore, the service liquids readily foul and clog the mechanical components of such flow meters.

There are a variety of flow meters known as "vortex flow meters" that utilize vortex wakes proceedings from obstacles placed in the flow to measure the velocity of the flow from the frequency of vortex shedding. Such flow meters are again limited to single phase flow. Again, they require placement of an obstacle in the flow, and hence are again prone to fouling. The temperature range of most systems is narrow due to fundamental restrictions on the sonic transducers required to pick up the sound generated by the obstacle.

There are a variety of acoustic flow meters that utilize ultrasonics to measure flow. A class of such flow meters utilizes an ultrasonic transducer/receiver attached to the pipe containing the moving fluid, and an ultrasonic receiver/transducer attached to the same pipe up stream and/or down stream of each other. The high operating temperature of many petroleum and petrochemical processes, as well as geometrical constraints on the attachment of the acoustic devices make these flow meters expensive and difficult to apply in many petroleum and petrochemical applications. The operating temperatures often exceed the operating limits of many single phase flow meters.

Measurement of the liquid fraction of a gas/liquid mixture flowing through two phase nozzles is difficult. Usual devices for flow measurement are sensitive only to the velocity of the flow or its pressure and not to mass flow. Hence, such devices are incapable of measuring liquid flow without separate and equally complex measurements of the density of the mixture. Devices that are capable of measuring single phase liquid flow are expensive, and are often intrusive since they require the insertion of an orifice or barrier in the flow which can be easily fouled by the liquid portion of the mixture. Since in most petroleum and petrochemical applications, the two phase mixture is maintained at an elevated temperature to achieve a sufficiently low viscosity for flow, there is a temperature limitation on flow measurement devices as well.

Thus most petroleum and petrochemical installations do not meter flows to each feed nozzle because suitable and easily maintained flow meters are expensive due to the severity of process conditions and pipe geometry limitations. The development of specialized flow meters to meet such stringent conditions would require significant expense and undesired complexity.

Although petroleum and petrochemical processing units may demonstrate improved operation with specified liquid distribution from manifolded feed nozzles, only the net liquid flow to the manifold is usually measured or controlled. However, without a measuring scheme the probability of a desired flow distribution among feed nozzles is small due to the complex nature of the two phase fluid exiting the nozzle. Uncertainties in liquid distribution are compounded by the possibility that a portion of the liquid feed could be vaporized.

The existence of such flow imbalance is usually inferred only by anomalous process conditions or from changes in output yields over an extended period of time. Furthermore, feed nozzles can partially plug or erode leading to significant flow maldistributions which can remain undetermined until the unit is shut down for maintenance. There is thus a need for a technique that can measure and monitor the liquid flow from an individual nozzle.

The present invention is a method for determining the mass flow rate of the liquid feed in individual feed services. The present invention shows how this measurement can be done passively and non-intrusively with respect to the flow by either (1) using a dynamic pressure transducer in acoustic contact with the acoustic energy within the fluid within the barrel of the feed nozzle or connected piping.

(2) using accelerometers in solid borne sound contact with the acoustic energy within the fluid within the barrel of the feed nozzle.

The term "non-intrusively" is used to mean that the sensor does not penetrate into the flow although it may be permanently installed approximately flush with the surface of the pipe interior. That is, the sensor is not disruptive to the flow.

From the method taught in this invention, liquid flow rate can be measured and monitored in real time for a wide degree of liquid/gas atomization conditions in individual feed services or nozzles. Since the method measures quantities related to the mass of the flowing fluid it is a widely applicable technique for many categories of two-phase fluid sprayers. Since it depends only upon the vibration and resonances inherent in the flowing systems and piping, it can be applied rapidly and with ease in a variety of systems. Since the output of the method taught is electronic in nature it is easily transmitted to a control system and the method can be used to automatically measure and control the feed atomization and feed flow through individual nozzles fed off a common manifold.

SUMMARY OF THE INVENTION

The present invention is a method for measuring the mass flow rate of liquid flow exiting a two phase (gas/liquid) feed nozzle. The present invention can also be expressed as a method for measuring liquid volumetric flow since the flow rate of liquid mass and volume are related by the nearly constant liquid density. For convenience in what follows, the "mass flow" shall be used to designate both liquid mass flow and liquid volumetric flow. The method includes determining the Power Spectral Density from the output of a vibrational sensor (accelerometer or dynamic pressure sensor) in close proximity to the nozzle or in contact with the fluid within the nozzle in a frequency band that includes resonant peaks (Liquid Flow Peaks or LFP) whose magnitude is strongly dependent on the mass flow rate of the the liquid and which increases as the flow increases. The frequency range of the power spectral density may include only a single dominant peak or a series of peaks. Measurement of the area of the resonant peaks or of a band of frequencies that includes them is proportional to the liquid flow and is insensitive to the gas flow. The proportionality constant between the magnitude of the LFP or of a band of frequencies including them can be determined before the nozzle is attached to the unit or by one time calibration.

The Power Spectrum of the vibrational sensor is defined as the distribution in frequency of the square of the output of the vibrational sensor (the Power Spectral Density). The power spectral density has the units in this invention of either acceleration squared per unit frequency (Hertz) or pressure squared per Hertz (Hz). The power spectrum has the property that the area of the power spectral density over any frequency range is equal to the mean square of the output of the vibrational sensor; for this invention, either the mean square acceleration or the mean square pressure. The Power Spectrum is most simply obtained as a plot of the power spectral density as a function of frequency by passing the output of the vibrational sensor into a digital signal processor (Bruel and Kjaer 2032 or similar). Under these circumstances it is often convenient to display in figures, the RMS Pressure or Acceleration Spectrum which is proportional to the square root of the Pressure or Acceleration Power Spectral Density. It is also often convenient to plot the square root of the area of the Power Spectrum of the vibrational sensor as the RMS Acceleration or RMS Pressure over a band of frequencies.

It is found experimentally that the LFP are found at relatively low frequencies and usually between 0 and 4000 Hz and in few cases above 6400 Hz.

The vibrational sensor can either be an accelerometer in contact with the shell of the feed nozzle or a dynamic pressure transducer in acoustic contact with the flow within the nozzle. One of the advantages of the present invention is that the method does not depend on nozzle geometry, working equally well for nozzles that achieve gas/liquid mixing by either having mixing vanes or flow restriction.

BRIEF DESCRIPTION OF THE DRAWINGS

FIG. 2A shows a typical Acceleration signal as a function of time. FIG. 2B shows the square of the Acceleration signal of FIG. 2A. The dotted line in FIG. 2B is the magnitude of the mean square acceleration. FIG. 2C shows the Acceleration Power Spectrum of the signal shown in FIG. 2A. The Acceleration Power Spectrum displays Acceleration Power Spectral Density as a function of frequency. The integral of the Acceleration Power Spectral Density over all the frequencies contained in the Acceleration signal shown in FIG. 2A is equal to the time average of the square of the Acceleration signal shown in FIG. 2B. FIG. 2D shows the RMS Acceleration Spectrum which is proportional to the square root of the Acceleration Power Spectral Density shown in FIG. 2C.

FIG. 2E shows another typical Acceleration signal as a function of time. FIG. 2E shows the Acceleration Power Spectrum of the signal shown in FIG. 2E. The Acceleration Power Spectrum displays Acceleration Power Spectral Density as function of frequency. The integral of the Acceleration Power Spectral Density between the frequencies, $F_1$ and $F_2$, indicated on FIG. 2F is defined as the area of the indicated peak. It is equal to the mean squared power of the acceleration time signal for the band of frequencies between $F_1$ and $F_2$.

FIG. 2G shows the Acceleration signal of FIG. 2F that has been passed through a filter device that reproduces the signal for frequencies, F, inside a pass band $F_1 < F < F_2$ and strongly attenuates the signal outside that band.

FIG. 2F shows the Acceleration Power Spectrum of the filtered signal shown in FIG. 2G. The Acceleration Power Spectrum displays the Acceleration Power Spectral Density as function of frequency. The integral of the Acceleration Power Spectral Density over all the frequencies contained in the Acceleration signal shown in FIG. 2G is equal to the time average of the square of the acceleration signal shown in FIG. 2G.

FIG. 6A shows the RMS Acceleration Spectrum derived from an accelerometer mounted as shown in FIG. 1D (Location (25)) for 150 gpm of water and 370 SCFM of air over the range 0-6400 Hz for the same injection nozzle whose RMS Acceleration Spectrum shown in FIG. 4A for the range 0-1600 Hz.

FIGS. 7A-7E show the RMS Acceleration Spectrum (0-1000 Hz) of an injection nozzle of a different design as that shown in FIGS. 3-6 for a constant flow of air at 230 SCFM and water flow varying from 0 to 240 gpm. The indicated peak near 600 Hz is the LFP.

FIG. 7F shows a plot of the water flow (gpm) of FIGS. 7A-7E as a function of the height of the indicated 600 Hz peak in FIGS. 7A-7E.

FIGS. 8A-8D show the RMS Acceleration Spectra over the range 800-2500 Hz a feed nozzle which is injecting a mixture of oil and steam into an operating cat-cracker. The location of the accelerometer was on the "rodding" plug of the feed nozzle (Location (24)) of FIG. 1D). The opening of the respective block valve is indicated on FIGS. 8A-8D. The LFP for the feed nozzle is also indicated.

DESCRIPTION OF THE PREFERRED EMBODIMENT

The present invention is a method for non-intrusively determining liquid (mass) flow exiting a two phase (gas/liquid) nozzle the method correlates vibrational power on the surface of the nozzle or related piping or of the fluid mixture within the nozzle to the liquid flow rate. In one embodiment of the invention, an accelerometer or other vibrational measuring device is attached to the shell of the feed nozzle or related piping in solid borne sound contact with the acoustic power within the fluid mixture. In another embodiment of the invention a dynamic pressure transducer is in contact with the gas-liquid mixture within the nozzle or related piping. In both cases the time varying electric signal from either of these sensors is amplified and then either recorded for subsequent processing or processed directly into a power spectrum. This power spectrum displays the frequency content of the vibrations of the nozzle or of the dynamic pressure fluctuations of the liquid within the nozzle. A general description of the electronic system by which the vibrational signal is correlated with liquid flow is given in what follows. Two phase feed injection nozzles of a fluidized catalytic reactor are sometimes used for illustrative purposes but this invention is not restricted to this use.

Figure 1B:
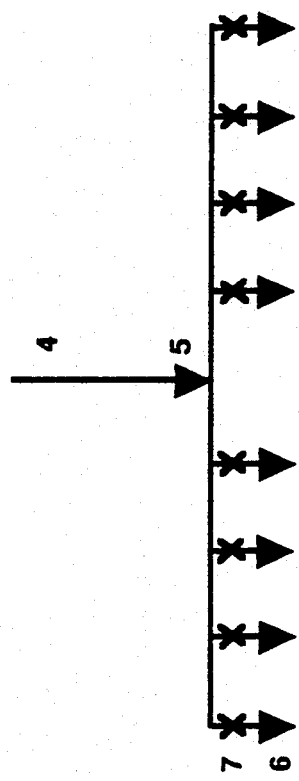
FIG. 1B shows the oil manifold supplying oil to an individual feed nozzle with oil block valves indicated (7).
Figure 1C:
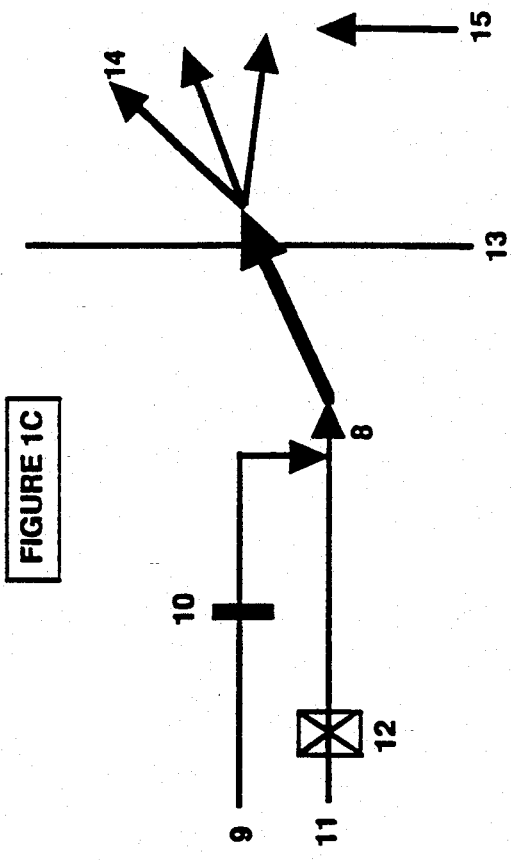
FIG. 1C shows the flow connections to an individual feed nozzle where the steam flow is determined through a restriction orifice (RO) (10) and where the oil flow is determined by a block valve (12).
Figure 1A:
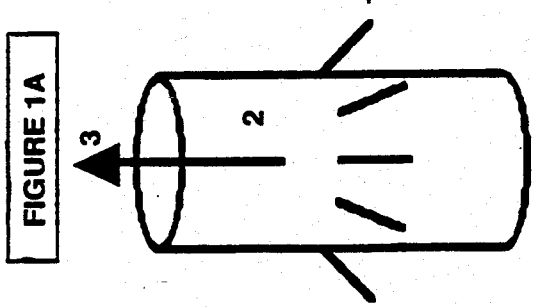
FIG. 1A shows a schematic of the feed injection zone in a fluidized catalytic cracking unit (FCC unit) indicating the placement of the feed nozzles.

FIG. 1A is a schematic of the injection region of a typical fluidized catalytic cracking unit/FCC unit showing the location of the eight (for this example) feed nozzles (1) injecting into feed riser (2) with catalyst flow (3) indicated. Oil to the feed nozzles is distributed from header (4) to a common manifold (5) a shown in FIG. 1B. As indicated in the figure, individual block valves (7) in each nozzle line control the oil flow to the (6) nozzle. As shown in FIG. 1C, steam (9) and oil (11) are fed to an individual nozzle; where the steam serves the dual purpose of atomizing the oil and keeping the nozzle unplugged when the oil is off. Oil flow is controlled by the block valves (12) as indicated in FIG. 1C; steam flow is controlled by having the high pressure steam flow through a restriction orifice (RO) (10) which typically under conditions of "choke flow" maintains a constant mass flow of steam independent of the downstream pressure. The nozzle protrudes into feed riser wall (13) to disperse atomized oil (14), into catalyst flow (15).

Figure 1D:
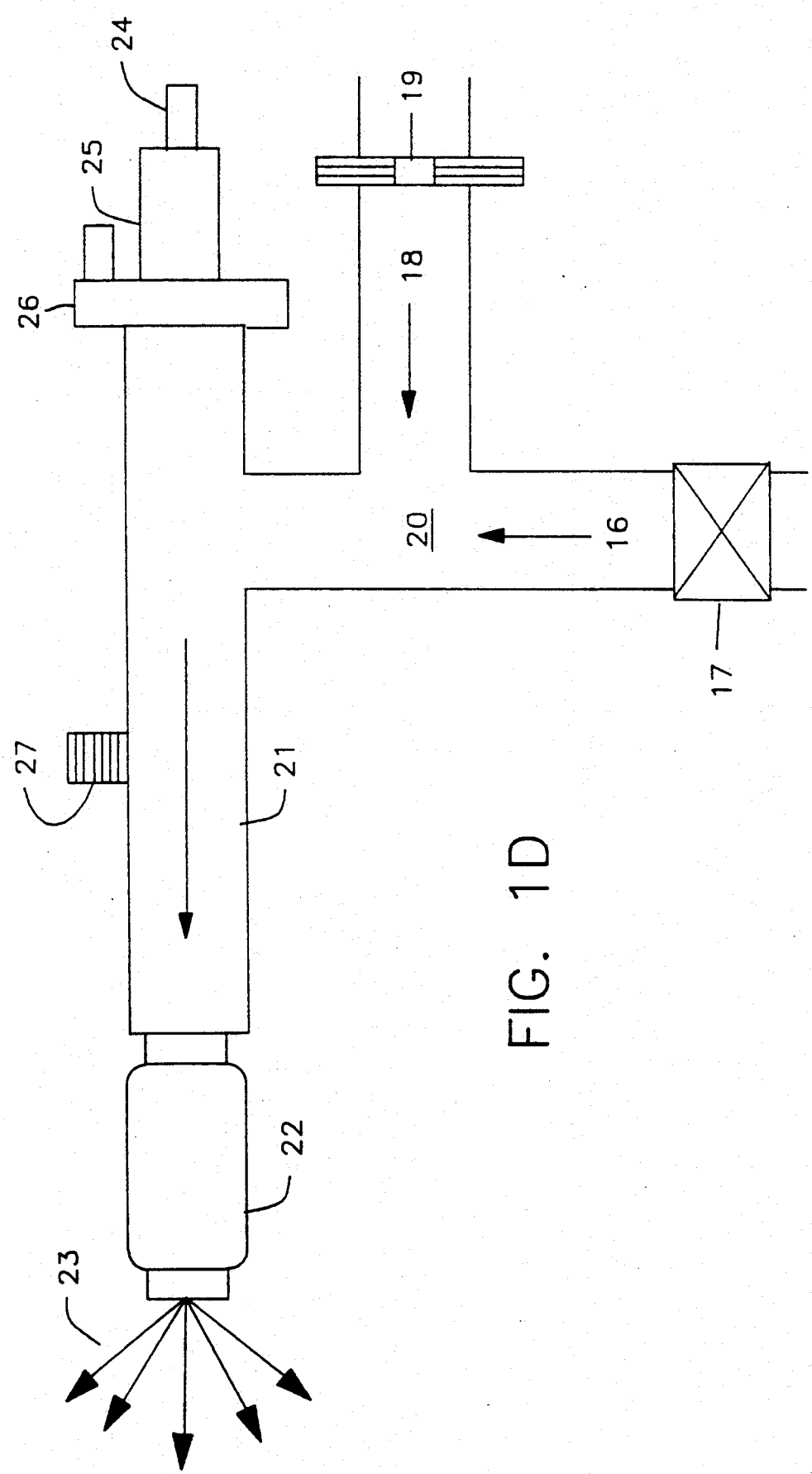
FIG. 1D illustrates a suitable location for the pressure transducer which should be in contact with the two phase fluid within the injection nozzle, and suitable locations for the accelerometer (25 & 26) which should be mounted such that it is sensitive to vibrational modes of the nozzle that are excited by the turbulent two phase stream exiting the nozzle tip.

FIG. 1D shows an individual feed nozzle plumbing in more detail. Oil (16) flowing through block valve (17) mixes with steam (18) controlled by RO (19). The oil/steam mix point (20) is located downstream of both the oil valve and RO. The mixture is pushed through nozzle barrel (21) to nozzle tip (22) and exits as a spray (23) from the nozzle tip.

In one embodiment of the invention, a vibrational sensor (24) is placed on rodding plug (25) or adjacent to the flange (26) supporting the rodding plug or in any location responsive to the liquid flow-generated sound and vibration. In another embodiment of the invention, a dynamic pressure transducer (27) is located to be in contact with the flow downstream of the mix point (20). Any location where the transducer is sensitive to changes in the flow rate is acceptable.

Figure 2A:
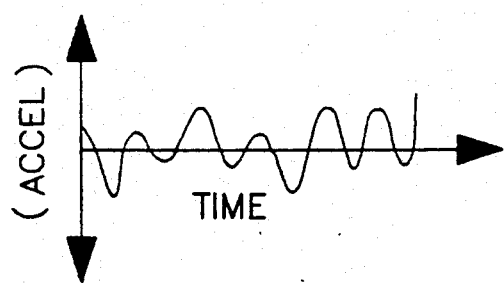
FIGS. 2A, 2B, 2C, 2D, 2E, 2F, 2G, and 2H illustrate the conversion of an unfiltere and filtered time varying acceleration (pressure) to an Acceleration (Pressure) Power Spectrum or to a RMS Power Spectrum. For specificity, the vibrational sensor in FIG. 2 is taken to be an acceleration sensor; a dynamic pressure sensor would do as well.
Figure 2B:
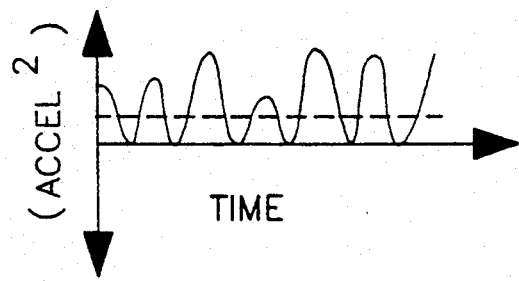
Figure 2C:
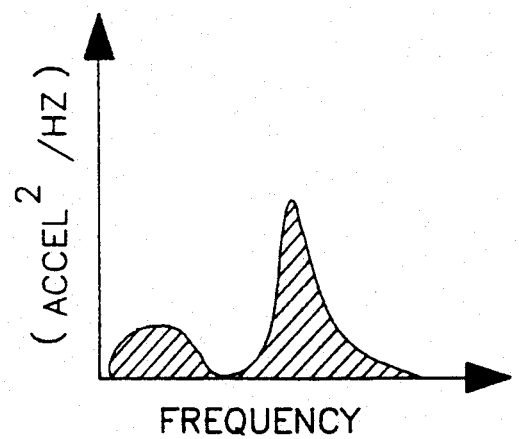
Figure 2D:
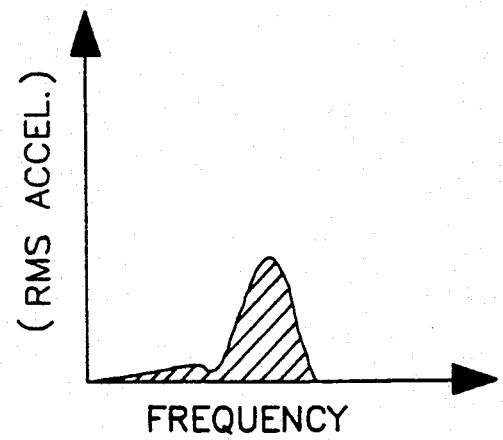
Figure 2E:
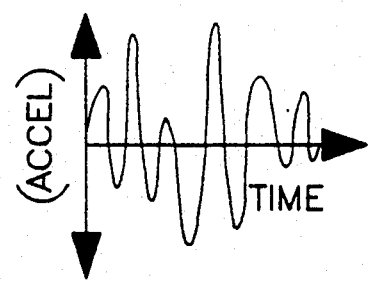

The magnitude of the time dependent electrical signal from the accelerometer, or dynamic pressure transducer illustrated in FIGS. 2A and 2E, is proportional to the vibrational power of the surface of the feed nozzle (accelerometer) and/or to the fluid within (dynamic pressure transducer). Quantitatively, the average of the square of this signal over a time interval is proportional to the Mean Square Power over that time interval. This quantity is one measure of the vibrational energy being produced by the turbulent flow exiting the nozzle as shown in FIG. 1D. In what follows we will sometimes refer to the output of either the accelerometer or dynamic pressure signal as the "vibrational signal" and the square of the output of either the accelerometer or the dynamic pressure transducer as the "vibrational power".

The present invention utilizes another measure of the vibrational power—namely the distribution of vibrational power over frequency. As is well known, the distribution of vibrational power is given by the Power Spectrum of the vibrational sensor which is a plot of the Power Spectral Density as a function of frequency. FIG. 2C shows the Power Spectrum of the time varying random signal of FIG. 2A. The area of the Power Spectrum density over any frequency range is proportional to the mean square vibrational energy of the time varying signal in that frequency range (FIG. 2B). The power spectral density for an accelerometer (dynamic pressure transducer) has the units of acceleration squared per hertz (pressure squared per hertz).

It is often more convenient to display the RMS Power Spectrum where the RMS Spectral Density is plotted as a function of frequency as shown in FIG. 2D. RMS stands for "Root Mean Square". The RMS Power Spectral Density for an accelerometer (dynamic pressure transducer) has the units of RMS acceleration (RMS pressure). Within a constant factor the RMS acceleration (or pressure) is equal to the square root of the power spectrum for acceleration or pressure. As is well known to those skilled in the art of digital signal processing, the proportionality factor between the Power Spectrum of the acceleration (pressure) and the RMS acceleration (pressure) spectrum is the square root of the frequency resolution of the signal processor.

The electrical output for both acceleration and pressure vibrational sensors is converted from a function of time to one of frequency by means of a digital signal processor or equivalent technique. The Power Spectrum displays the power of the signal as a function of frequency and has the unique property that the area of the power spectrum density over a frequency band is proportional to vibrational power in that frequency band.

It has been discovered that the vibrational power in certain regions of the Power Spectrum can be used to measure the volumetric of liquid flow rate exiting the two phase nozzle. In some cases the method of measuring the flow utilizes the power in a specific peak in the Power Spectrum; in other cases, it can be shown that the power of a band of frequencies in the Power Spectrum, including the peak, can also be a measure of the liquid flow. In some cases the height of the peak can also be used as a measure of the liquid flow.

There are alternative signal processing techniques that may have significant cost or performance advantages over computing the entire Power Spectrum. For example, once the above band of frequencies has been identified, the energy content of the band can be determined in a variety of ways. Digital (or other) band pass filtering of the signal from the vibrational sensor followed by power detection is equivalent to measuring the area of the Power Spectrum over a selected bandwidth. The specific signal processing technique by which the energy content of the vibrational signals over a band of frequencies is determined is not critical as long as the frequency range includes peaks or series of peaks whose area is a sensitive function of the mass of liquid exiting the nozzle. It is also not critical for the purpose of this invention, whether the necessary signal processing of the vibrational signals is done on the platform adjacent to the injection nozzle, or done in the control room, or distributed between them.

It is critical for the purpose of this invention, that field calibration be used to identify peaks and associated regions of the Power Spectrum whose area (or mean square vibrational power) is a strong function of the acoustic noise generated by liquid flow exiting the nozzle in question. In what follows, these peaks are denoted as Liquid Flow Peaks (LFP). In this patent the measure of the vibrational power in the frequency band that includes the Liquid Flow Peaks will be the RMS Acceleration (or Pressure) which is defined by the square root of the area of the power spectral density over a frequency band that includes the Liquid Flow Peaks. This area will be designated as the ALFP and has the units of RMS acceleration (or pressure). It has been discovered that the ALFP is directly correlated with the volume of liquid flow. In many cases, the ALFP is a linear function of the liquid flow rate, but for the purpose of this patent does not have to be. Establishing the correlation factor between the ALFP and liquid flow from the nozzle can either be done in a test facility where liquid can be measured directly or by field calibration as described later. Above the liquid flow peaks on the frequency spectrum are gas flow peaks which are primarily responsive to gas flow through the restriction orifice. These gas flow peaks are not relevant to the present invention.

The Liquid Flow Peaks (LFP) are usually found at relatively low frequencies and it appears that they arise from longitudinal "organ pipe" resonances excited by the turbulent stream exiting the two phase injection nozzle. The excitation of the "organ pipe" resonances would be expected to be proportional to the kinetic energy of the liquid exiting the nozzle and hence a function of the mass flow. However, it is well known in acoustics that the frequencies of resonances can depend on the coupling between the fluid and the mechanical structure surrounding it, as well as all acoustic paths within the two phase liquid available. For these reasons the LFP's are specific to given nozzle and its plumbing, and have to be determined directly for the working injection nozzle.

Figure 2F:
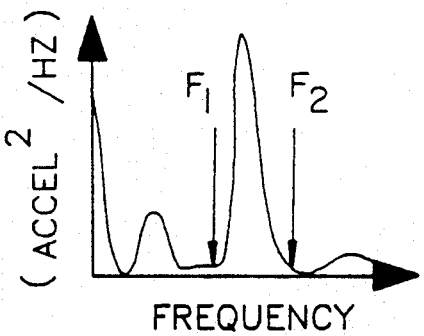

FIG. 2E shows the time varying signal from a vibrational sensor (accelerometer or dynamic pressure). FIG. 2F shows a plot of the power spectral density of such a transducer. The peak between frequencies F1 and F2 is meant to represent the LFP. The area under the Power Spectral Density curve between frequencies F1 and F2 is the ALFP. This area is equal to the mean square power of the vibrational sensor in the frequency band between F1 and F2.

Figure 2G:
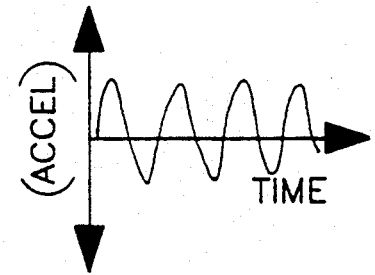
Figure 2H:
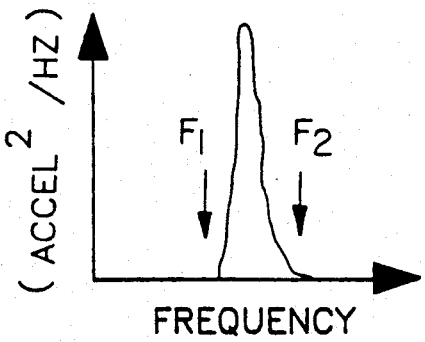

Once the Liquid Flow Peak (LFP) has been identified through its dependence on liquid flow, the ALFP can be determined in a variety of ways. One approach has been described above based on a digital signal processor. There are other ways which may be sometimes convenient. For example, the original vibrational signal shown in FIG. 2E can be passed through a filter which strongly attenuates vibrational energy at frequencies below F1 and above F2. Such a filter is known as a digital or analog "band-pass" filter. If the vibrational signal shown for FIG. 2E is passed through such a filter, the output is a different vibrational signal as illustrated in FIG. 2G. The signal shown in FIG. 2G only has a finite Power Spectral Density between F1 and F2 as shown in FIG. 2H. The time varying signal of FIG. 2G can be squared in a suitable electronic device and average (rectified and filtered) to give a dc signal that is proportional to the ALFP that was illustrated in FIG. 2H.

In general the LFP are often found in the relatively narrow range of 0 to 6400 Hz for injection nozzles of common use in petroleum refining and the petrochemical industry corresponding to two phase flow in the flow regime where liquid flow is from 50 to 300 gpm (gallons per minute) and gas flow in the regime is 50 to 450 SCFM (mass flow of gas in standard cubic feet per minute).

Figure 3:
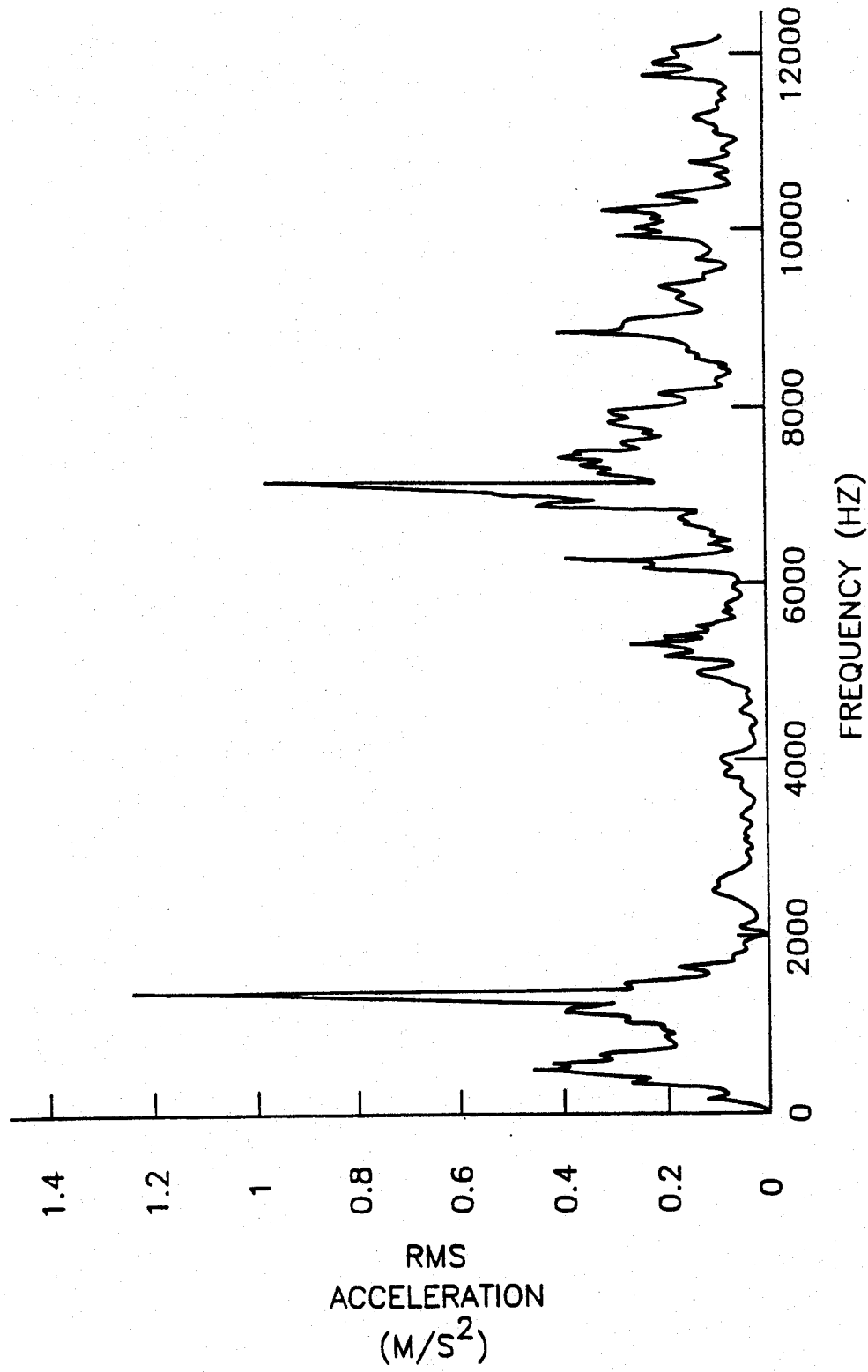
FIG. 3 shows the RMS Acceleration Spectrum from an accelerometer mounted on the rodding plug (FIG. 1D) (Location 25) of a feed nozzle on a cat-cracker injecting oil and steam into the feed riser of a FCC unit. The region of the spectrum for this nozzle containing the "Liquid Flow Peaks (LFP)" (0-4000 Hz) which increase with increasing oil flow, and the "Gas Flow Peaks (GFP)" (4,000-12,8000 Hz) which decrease with increasing oil flow are approximately indicated. Precise identification of these peaks, and the regions of the RMS Acceleration Spectrum where they are found, is based on field calibration.

FIG. 3 shows the RMS acceleration power spectrum (Location 25 of FIG. 1D) from an accelerometer mounted on the "rodding plug" of a working feed nozzle. The liquid Flow Peaks (LFP) whose amplitude increases with oil flow are found in this example below 2000 Hz. The Gas Flow Peaks whose amplitude decreases with oil flow, are found for this nozzle are found in a significantly higher frequency range; for the case of this nozzle the Gas Peaks lie between 4,000 and 12,000 Hz.

Figure 4A:
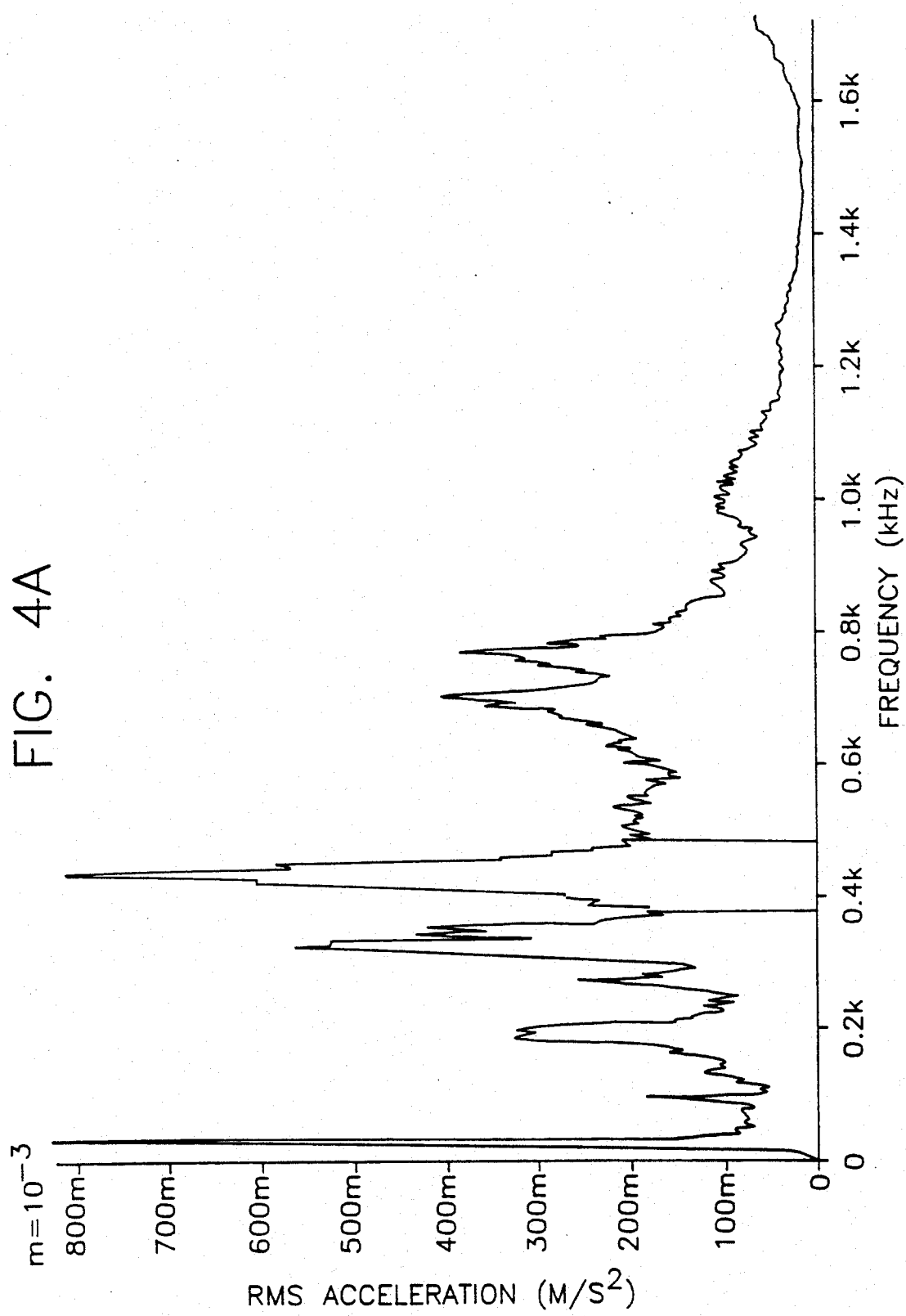
FIG. 4A shows the RMS Acceleration Spectrum (units of $Ms^{-2}$) derived from an accelerometer mounted as shown in FIG. 1D (Location 26) for 150 gpm (gallons per minute) of water and 370 SCFM (volume flow in standard cubic feet per minute) of air over the range 0-1600 Hz. The Liquid Flow Peak is the shaded region about 400 Hz.
Figure 4B:
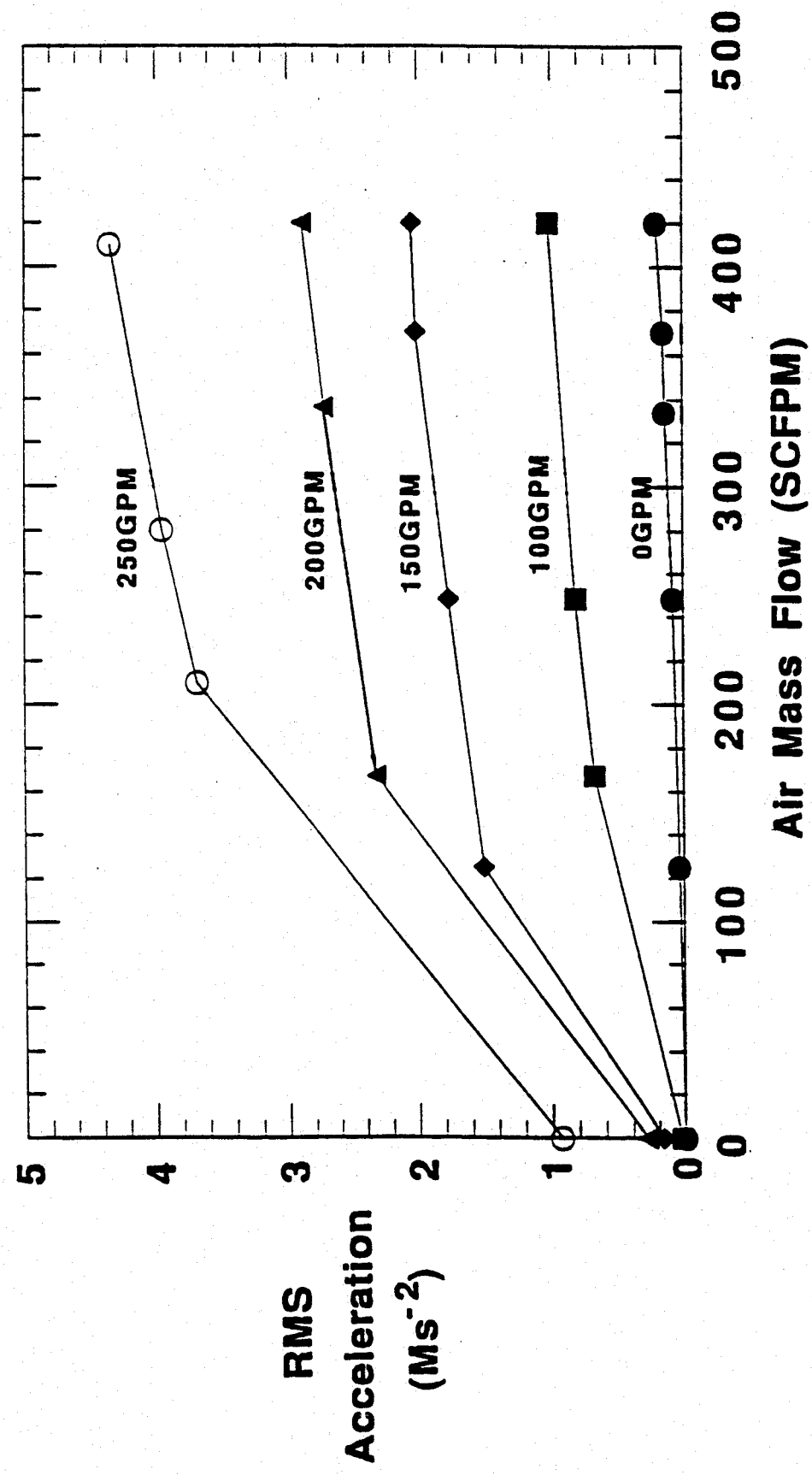
FIG. 4B shows a plot of the area of the shaded peak in the RMS Acceleration Spectrum defined by the shaded region of FIG. 4A as a function of air mass flow for discrete values of liquid exiting the injection nozzle. This peak is the Liquid Flow Peak (LFP) in question. The area of the LFP is denoted the ALFP (units: $Ms^{-2}$).
Figure 4C:
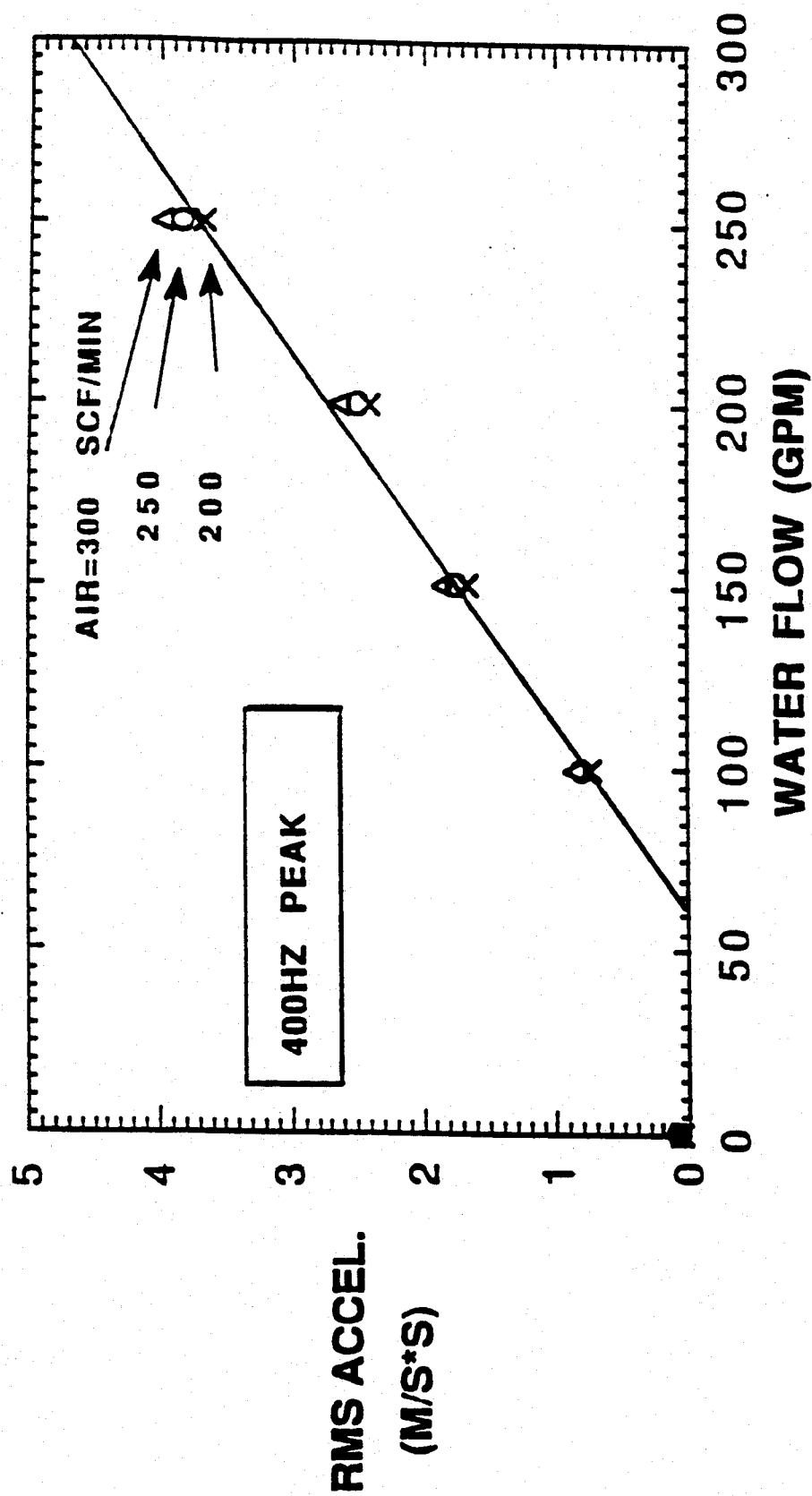
FIG. 4C shows the linear dependence of the area of the 400 Hz peak for the feed nozzle (ALFP) of FIG. 4B as a function of water flow for air flows of 200, 250 and 300 SCFM.

FIGS. 4B, and 4C illustrate the method of the present invention when a plant scale injection nozzle is attached to a test facility where gas (air) and liquid (water) flow to the nozzle can be determined directly. The acoustic properties of air and water are similar to the acoustic properties of the gases and liquids in common use within petroleum refining and the petrochemical industry. FIG. 4A shows the RMS Acceleration Spectrum of the accelerometer signal attached in location 26 of FIG. 1D over the range 0-1600 Hz for water flow of 150 gpm (gallons per minute) and air flow of 370 SCFM (standard cubic feet per minute). The LFP at 400 Hz is identified by the arrow and its area identified by the shading. The ordinate of FIG. 4B is the square root of the area of the LFP, in units of meter per second$^2$ (Ms$^{-2}$) plotted as a function of the measured air mass flow (SCFM) for different liquid flow rates (gpm).

From FIG. 4B, and clearly shown in FIG. 4C, the ALFP is an approximately linear function of the liquid flow and is relatively independent of gas flow in the flow regime of liquid flow above 100 gpm and air flow above 100 SCFM.

Figure 5A:
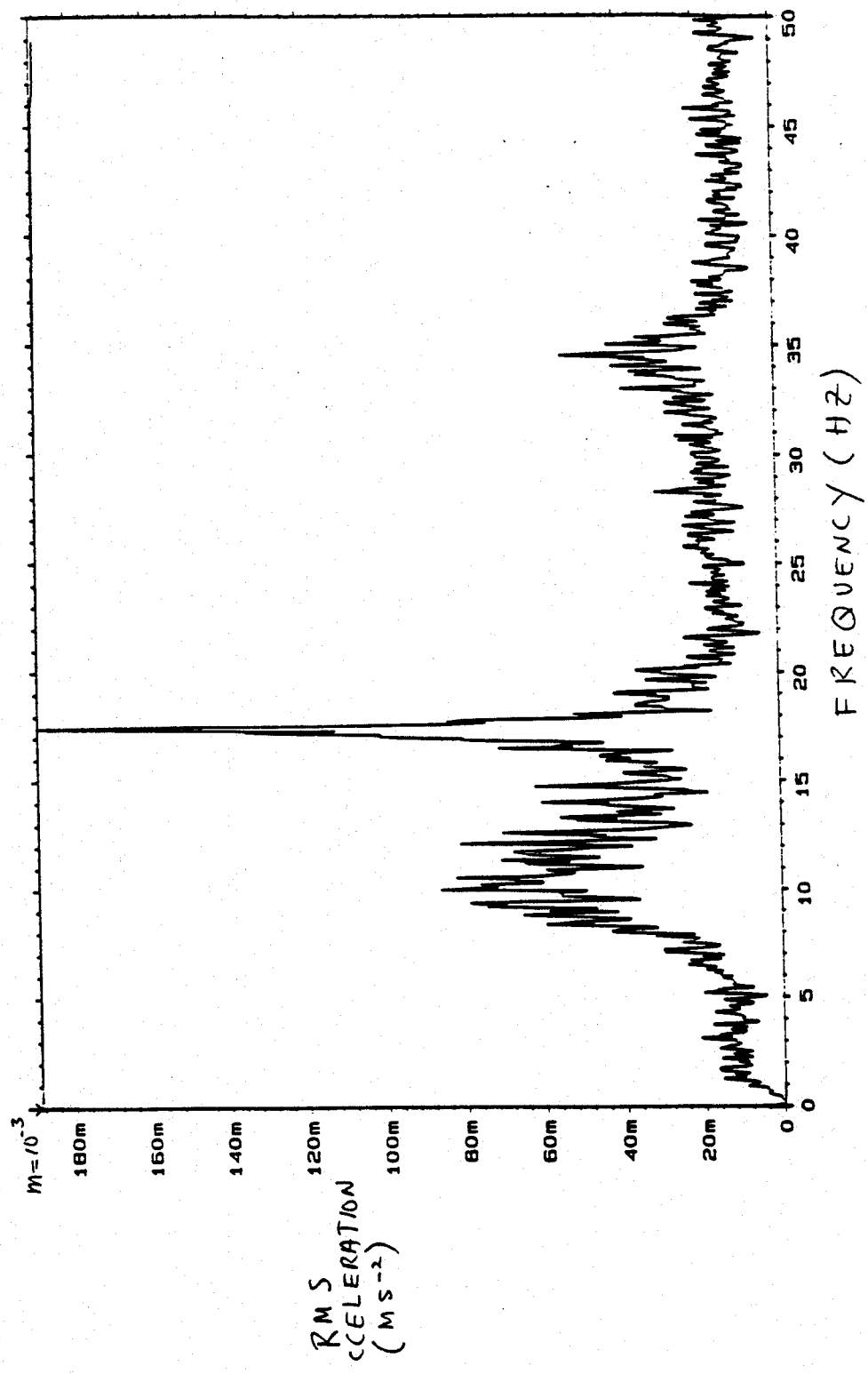
FIG. 5A shows the RMS Pressure Spectrum (27) (units:Pounds per inch$^2$) derived from a dynamic pressure transducer mounted as shown in FIG. 1D for 150 gpm of water and 248 SCFM of air over the range 0-50 Hz for the same nozzle whose RMS acceleration spectra is shown in FIG. 4A.
Figure 5B:
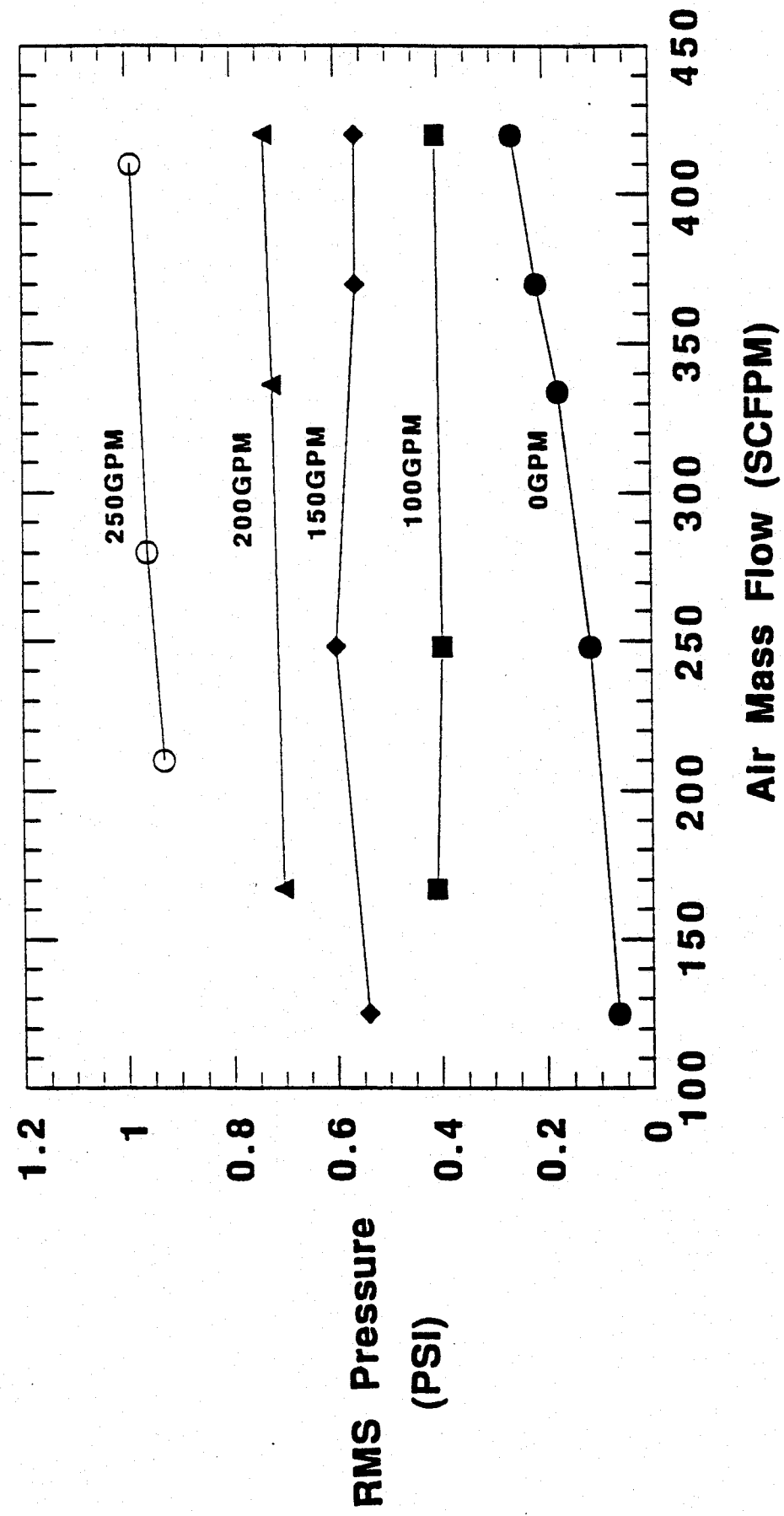
FIG. 5B shows a plot of the area of the RMS Pressure Spectrum over the full 50 Hz range (ALFP; units:-pounds per inch$^2$) as a function of air flow for discrete values of liquid flow exiting the inject nozzle illustrating the weak dependence on air flow.
Figure 5C:
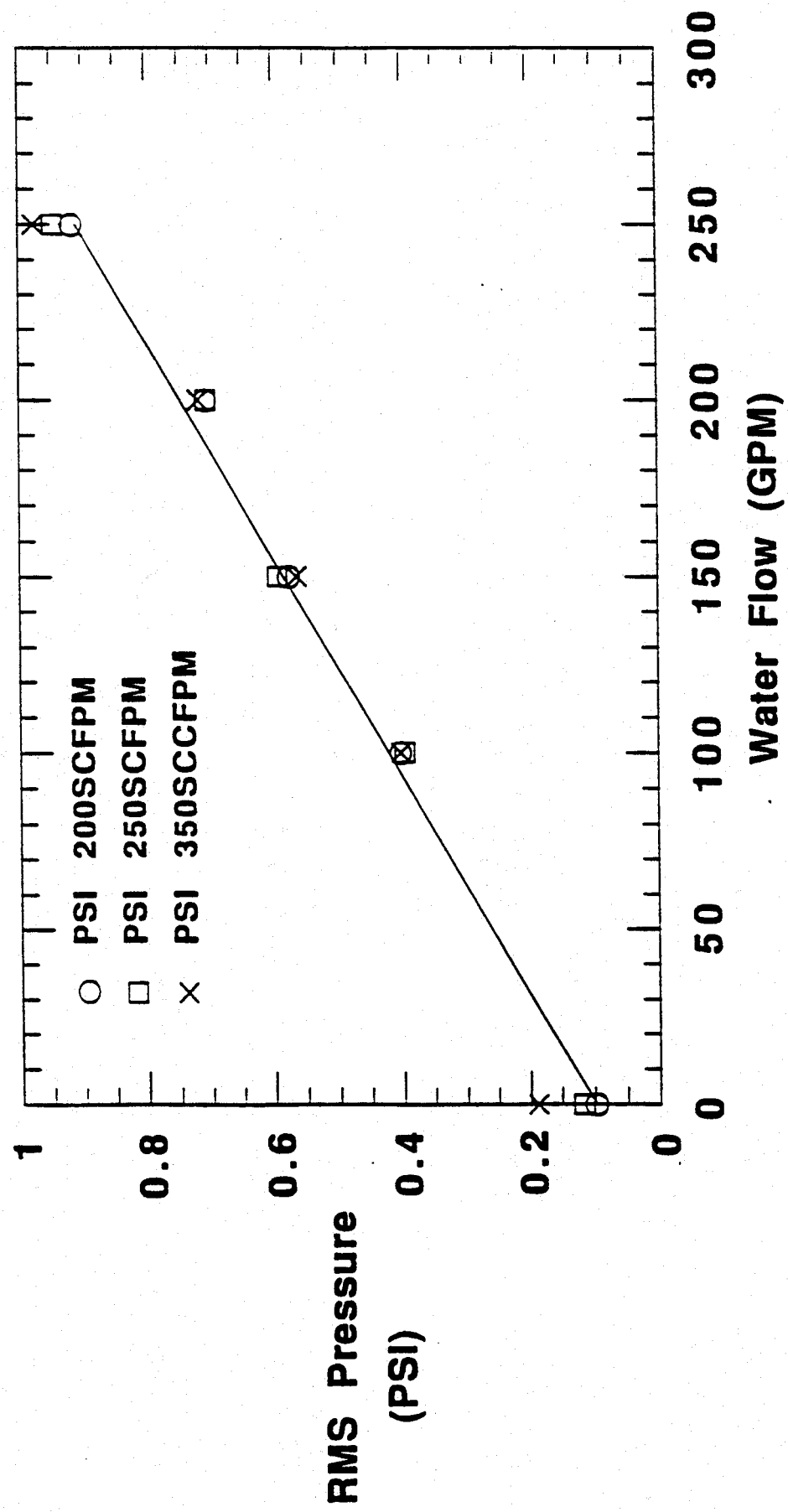
FIG. 5C shows the linear dependence of the area of the RMS Pressure Spectrum over the full 50 Hz range (ALFP) of FIG. 5B as a function of water flow for air flows of 200, 250 and 300 SCFM illustrating the strong dependence on water flow.

FIG. 5A shows the RMS Pressure Spectrum over the range 50 Hz of output of a dynamic pressure transducer obtained for the same nozzle as in FIG. 4A whose RMS acceleration spectra is shown for water flow of 150 gpm and air flow of 270 SCFM. The ALFP is defined as the area of the Power Spectrum from 0-50Hz. The ordinate of FIG. 5B is the ALFP (pounds per square inch) plotted as a function of the measured air flow (mass flow in SCFM) with different liquid flow rates in gallons per minute. For air flow above about 100 SCFM and liquid flows between 0 and 250 gpm, the RMS pressure over the 50 Hz band is an approximately linear function of the liquid flow rate as is shown directly in FIG. 5C.

Figure 6B:
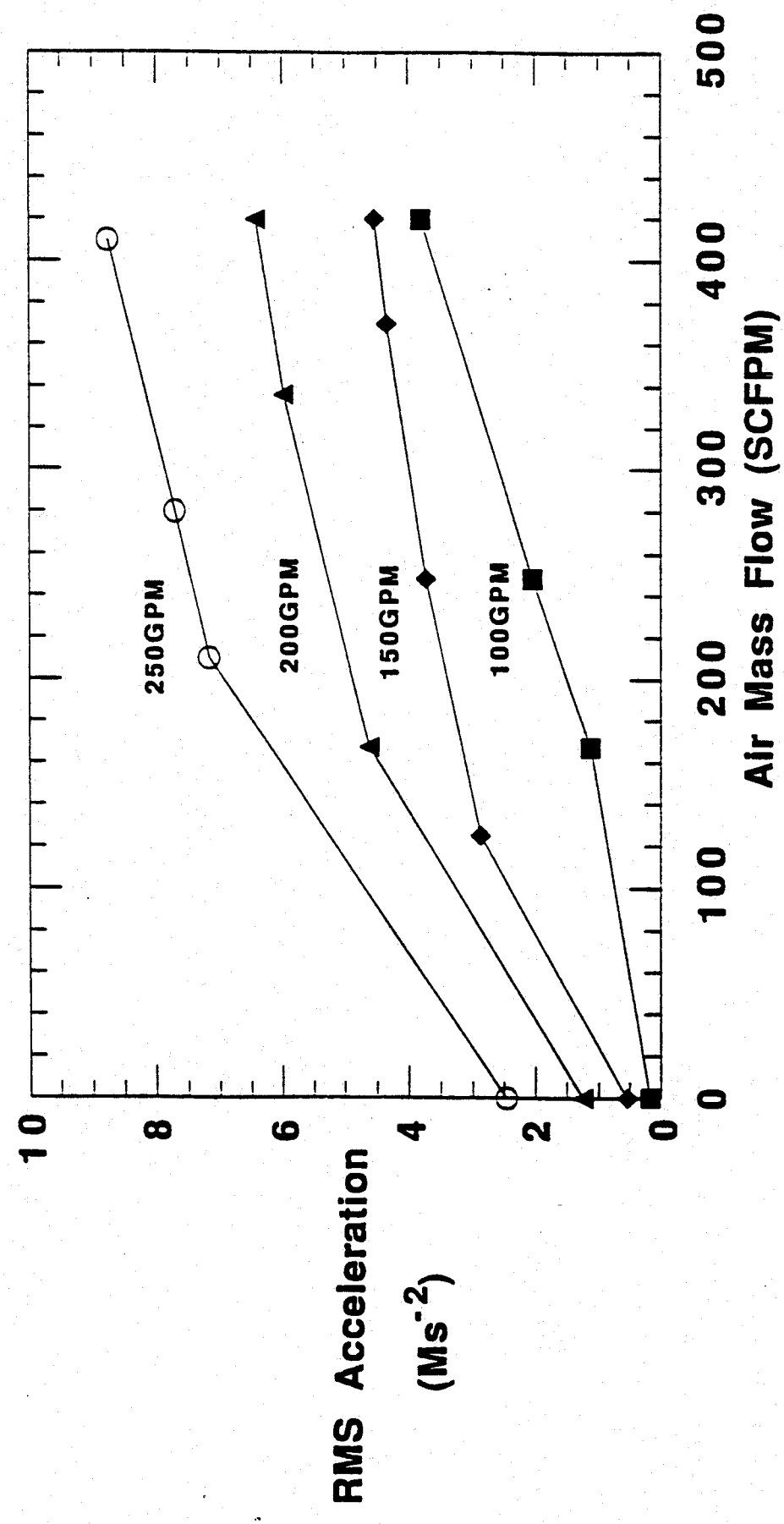
FIG. 6B shows a plot of the area of the RMS Acceleration Spectrum (ALFP) over the range 0-6400 Hz for the nozzle whose RMS Acceleration Spectrum is shown in FIG. 6A as a function of air mass flow for discrete values of liquid exiting the injection nozzle.
Figure 6C:
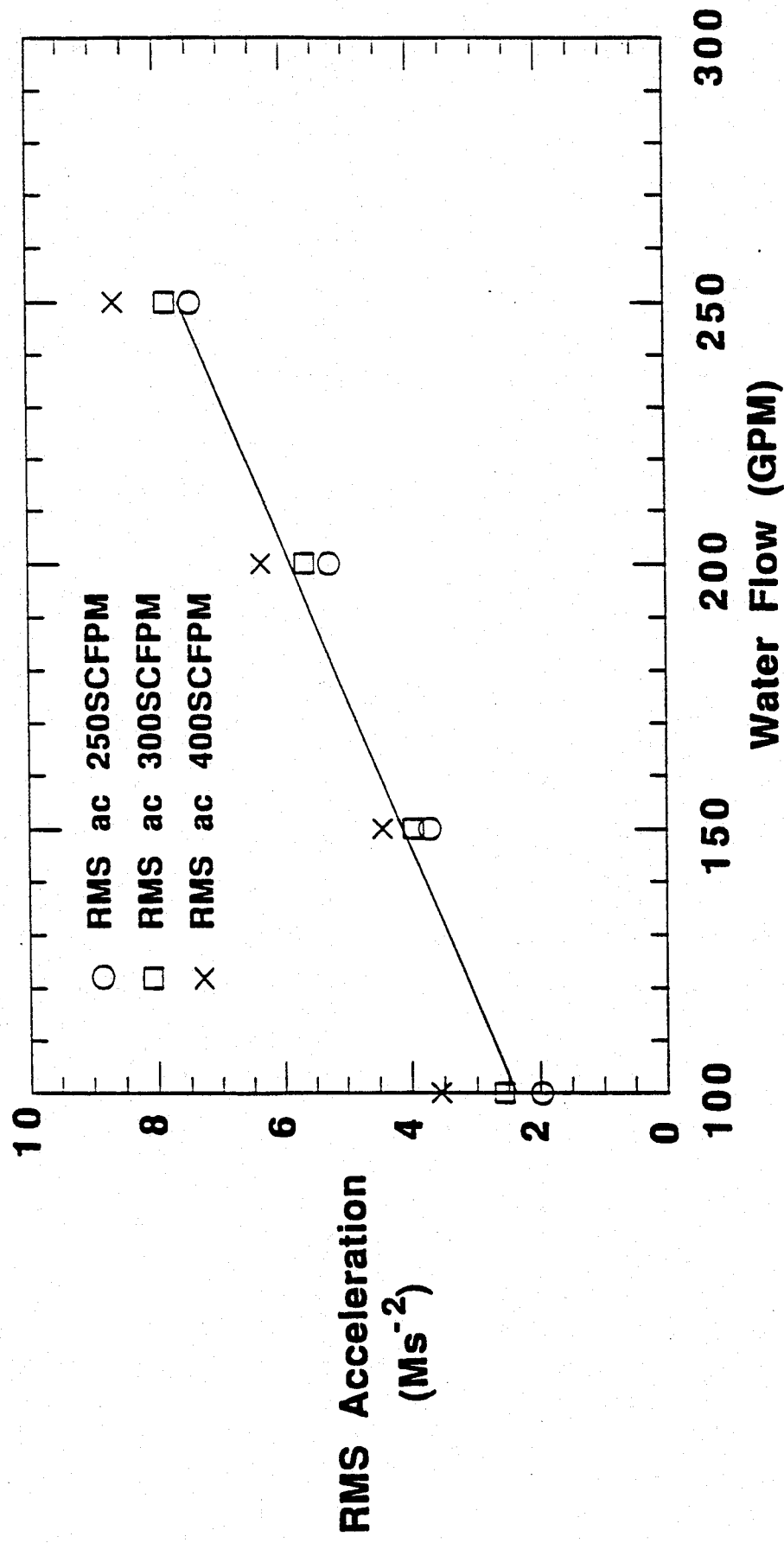
FIG. 6C shows the linear dependence of the area of the RMS Acceleration Spectrum (ALFP) for the injection nozzle of FIG. 6B as a function of water flow for air flows of 200, 250 and 300 SCFM.
Figure 7A:
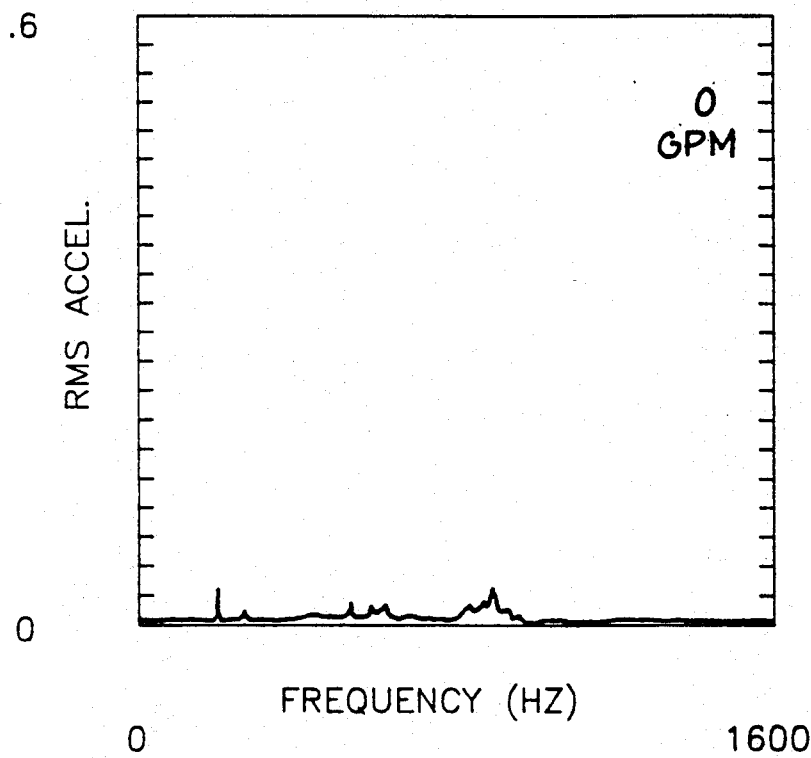
Figure 7B:
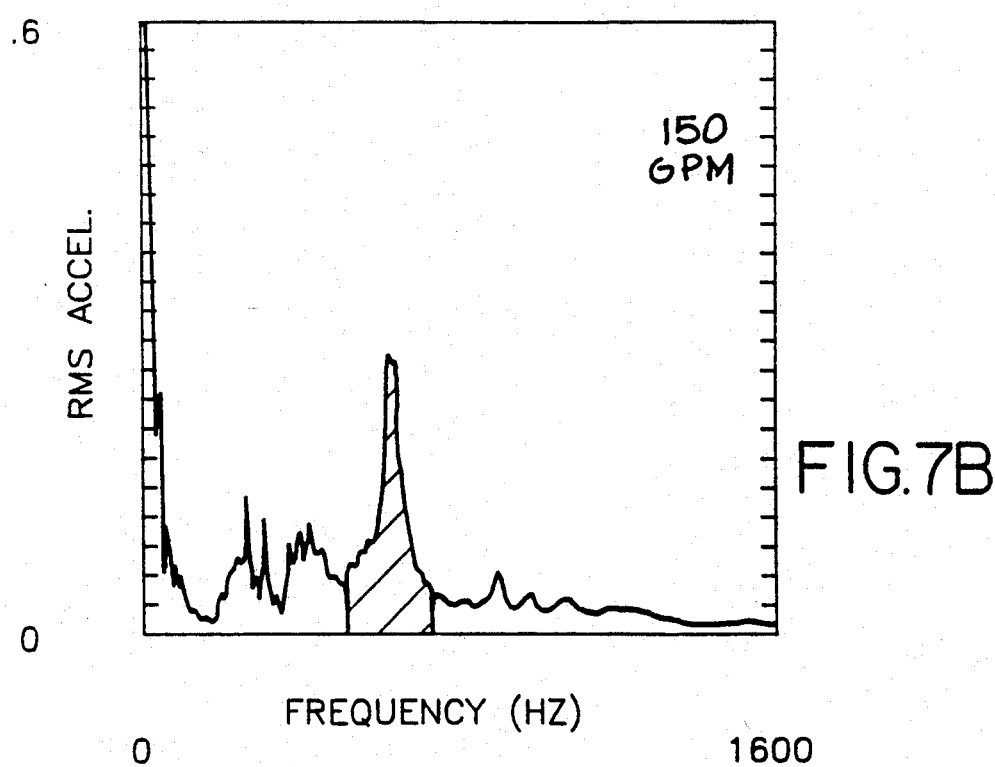
Figure 7C:
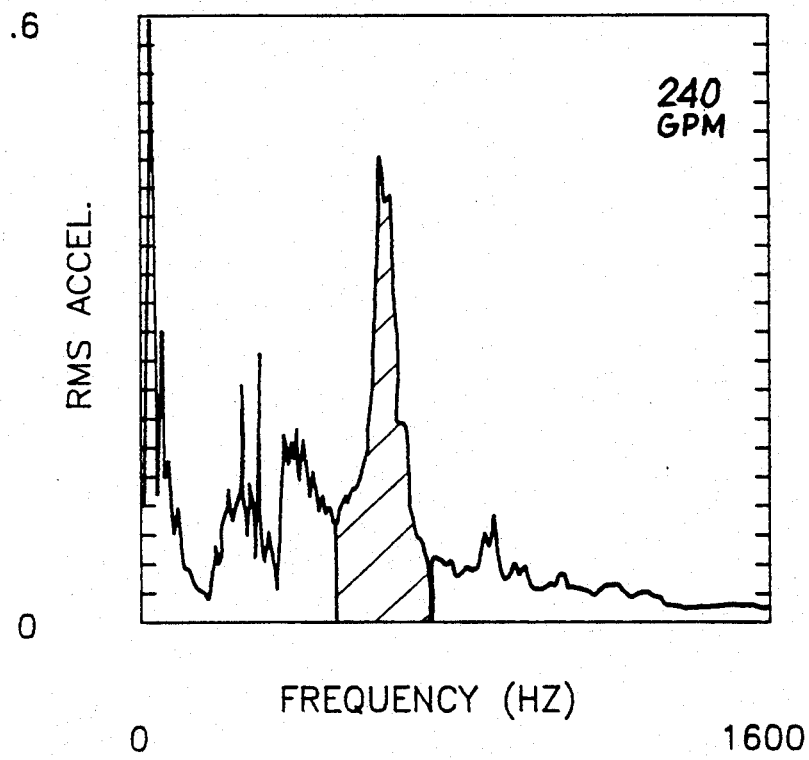
Figure 7C:
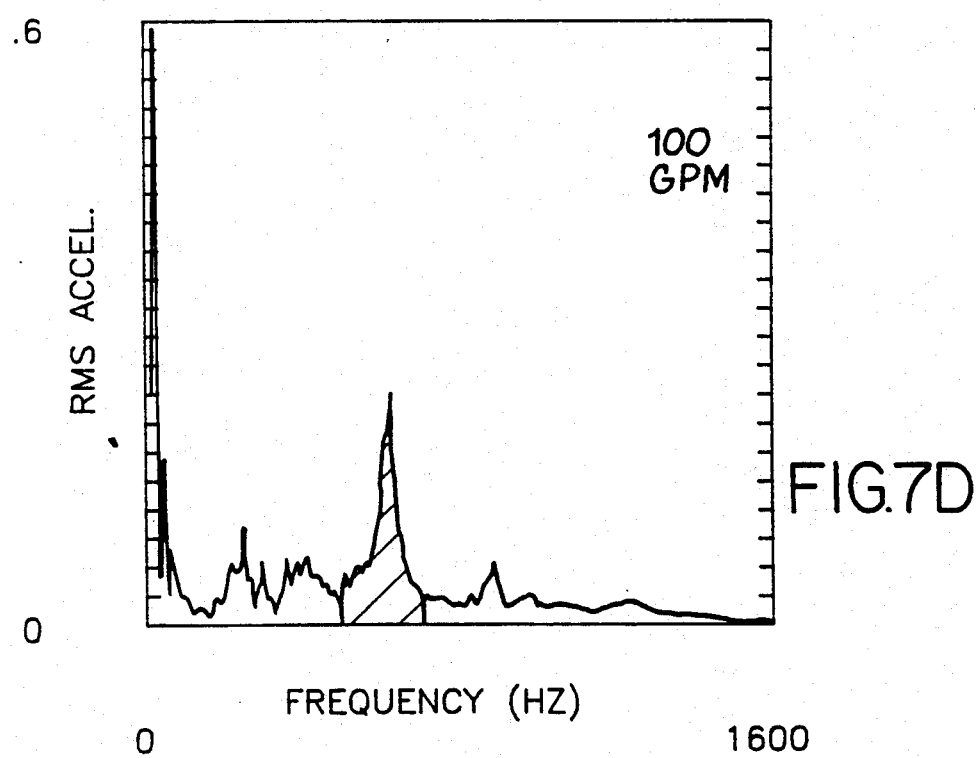
Figure 7E:
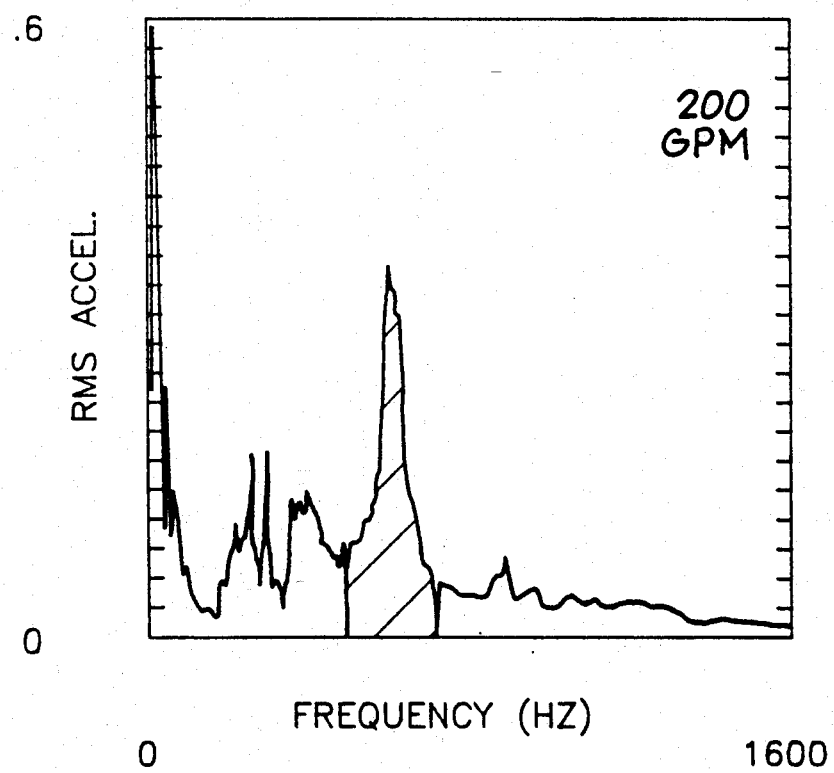

FIG. 6A shows the RMS Acceleration Spectrum of the accelerometer over the range 0-6400 Hz for the same nozzle utilized in FIGS. 4A, 4B, and 4C, and for the same flow conditions as in FIG. 4A. The ordinate in FIG. 6B is the ALFP as a function of air flow for different values of liquid flow. The curves of FIG. 6B are very similar to that of FIG. 4B showing the relative insensitivity of the ALFP to the precise bandwidth chosen for the area as long as the bandwidth includes the LFP at 400 Hz. FIG. 6C, is a plot of the ALFP as a function of volume of liquid flow rate at constant air flow. FIG. 6C is similar to FIG. 4C despite the increased bandwidth, because the ALFP is dominated by the LFP (400 Hz) and its harmonics over the range 6400 Hz for the flow regime in question.

It is clear that if separate liquid flow measurements are made, the correlation connecting the ALFP and the liquid flow rate can be obtained. Sub sequent measurements of the ALFP can then be used to monitor and measure the oil flow from individual injection nozzles and optimize the refining or petro-chemical process with respect to the flow distribution. Blocked or partially blocked feed nozzles can be identified and corrective action taken.

In a plant environment the LFP can be identified by changing the oil block valve ((12) of FIG. 1C) in steps from fully closed to fully open and identifying the peaks in the power spectrum that change. There are several ways of calibrating the ALFP and the liquid flow out of the nozzle.

The correlation between the ALFP and liquid flow can be determined by measuring the change in oil flow to the manifold when the block valve of a specific nozzle is changed while the pressure in the manifold is kept constant. Under these circumstances the flow out of the other nozzles is unchanged and the change in the net flow to the manifold is the flow to the nozzle in question. After the correlation coefficient has been determined for each nozzle, the assumption of unchanged oil flow to the other nozzles when the block valve on one nozzle is changed, can be tested. Another alternative is the direct one of measuring directly the liquid flow to the nozzle in question, replacing the oil and steam by more easily handled liquids and gases such as water and air, and measure the ALFP for a range of liquid flow that correspond to the operating conditions of the nozzle in question. Yet another way to calibrate the ALFP with respect to liquid flow is to insert for the time of calibration, a flow meter in the liquid line. Once the calibration has been obtained, the ALFP for that nozzle can be used as a measure of liquid flow.

FIGS. 7A-7F and 8A-8E illustrate two alternative ways of calibrating the vibrational signal with respect to liquid flow for the same injection nozzle; in this case a FCC unit feed nozzle. In FIGS. 7A-7F the liquid flow to a specific nozzle was measured directly; in this case the liquid was water and the gas was air. In FIGS. 8A-8E, constant pressure was maintained to the oil manifold feeding the nozzle in question, and the change in total oil flow to the manifold was measured directly as the valve controlling the flow to the nozzle was changed. At the same time the ALFP was measured. The gas in this case was steam.

FIGS. 7A-7E show a series of RMS Acceleration Power Spectra for the cat-cracking feed injector tested with water and air. The design of the mixing chamber within this nozzle is considerably different from the nozzles considered in FIGS. 4-6. The shaded illustrates the LFP at 600 Hz. In FIG. 7F the changes in the peak height of the LFP (which for the data of FIGS. 7A-7E are proportional to the ALFP) are shown to be a linear function of the water flow at constant air mass flow (230 SCFM). This is one way of obtaining the correlation between the ALFP and the liquid flow exiting the nozzle.

The alternative way of calibrating the correlation between the vibrational signal and the liquid flow exiting the nozzle is described below. The oil flow to the nozzle in question was determined from the change in oil flow to the oil manifold under constant pressure conditions.

FIGS. 8A-8D is the RMS Acceleration Spectra for the acceleration over the range 800-2500 Hz for a feed nozzle on a working FCC unit. The shaded region is the LFP which is at about 1650 Hz. The accelerometer which is the source of the vibrational signal is mounted on the "rodding" plug of the nozzle (Location (25) of FIG. 1D). In each the control variable is the oil block valve setting (indicated in % Open) and the LFP is indicated by the shading. Measurement of the change in the manifold oil flow when the feed nozzle is shut off from any specific setting it is possible to estimate the oil flow corresponding to the setting of the oil block valve.

Figure 8E:
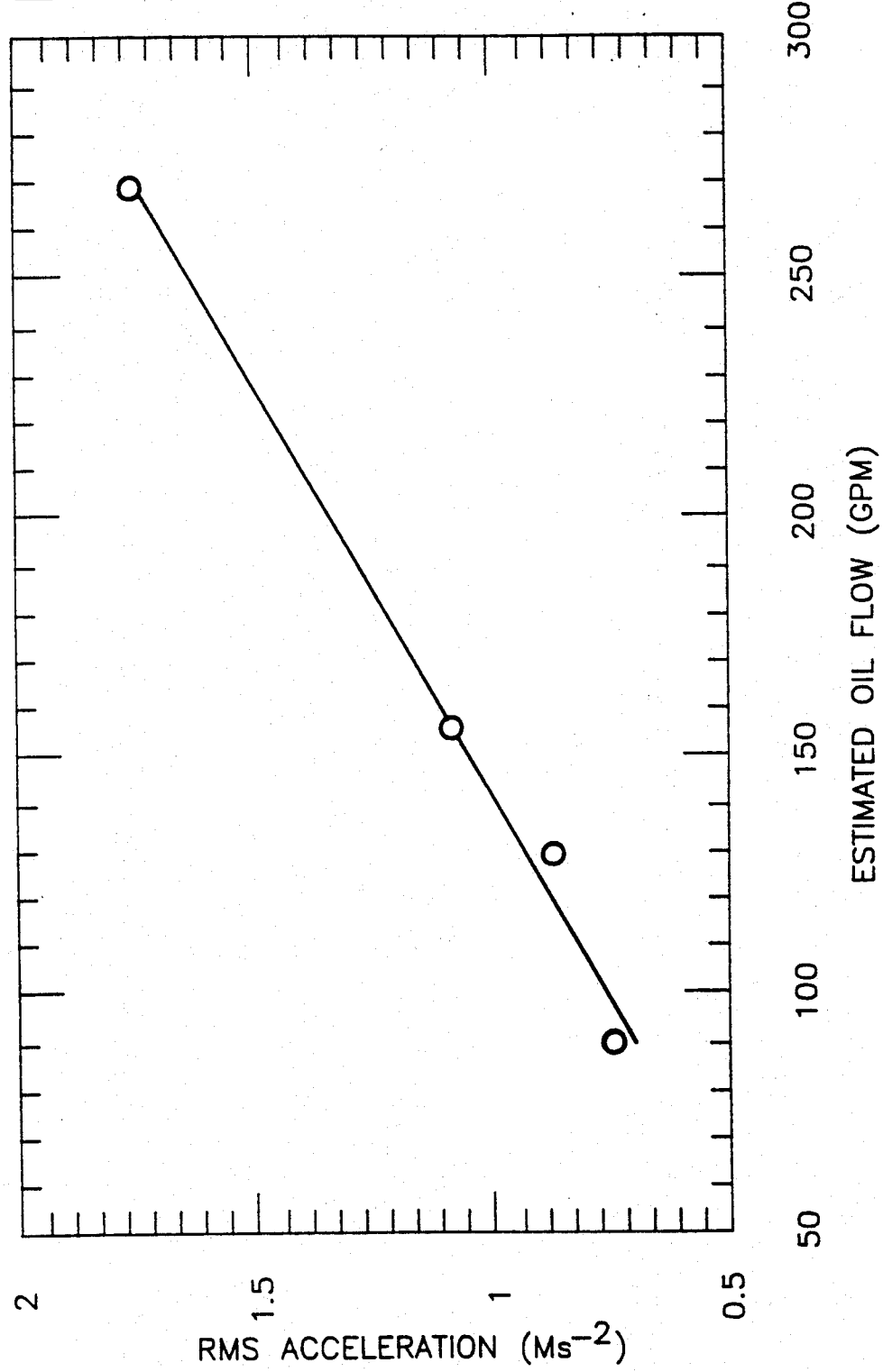
FIG. 8E shows the linear correlation between oil flow and RMS acceleration defined by area of the "Oil Peak" (ALFP) for the feed nozzle in FIGS. 8A-8D.

FIG. 8E exhibits the linear correlation that is obtained between the ALFP and the measured liquid flow. From this correlation the liquid flow through the feed nozzles can be estimated by suitable algorithms. Changes in the oil block valve can be made to optimize the flow into the injection zone of the FCC unit. In addition the ratio of steam to oil can be monitored and controlled by measuring the oil flow and changing the steam mass flow by suitable changes in the steam restriction orifice (FIG. 1C).

What is claimed is:

1. A method for measuring the mass flow rate of liquid flow into a two-phase liquid/gas injection nozzle comprising:
   (a) determining the power spectral density from a signal from a vibrational sensor in close proximity to said nozzle over a frequency band which includes a series of liquid flow peaks, where the area of the power spectral density of said Liquid Flow Peaks has a monotonically increasing relationship with respect to the liquid flow through said nozzle;
   (b) determining the magnitude of the area or, the height of said power spectral density including said liquid flow peaks;
   (c) determining the mass of liquid flow through said nozzle from a correlation between different magnitudes of said area or said height of said power spectral density including said liquid flow peaks and the mass flow rate of liquid flow for said nozzle.

2. The method of claim 1 wherein said vibrational sensor is an accelerometer.

3. The method of claim 1 wherein said vibrational sensor is a pressure transducer in contact with said liquid/gas flow in said nozzle.

4. The method of claim 1 wherein said power spectral frequency band extends from 0 to 6400 Hz.

5. The method of claim 1 wherein said area that is determined in steps (b) and (c) only includes the Liquid Flow Peaks.

6. The method of claim 1 wherein said area that is determined in steps (b) and (c) only includes the dominant Liquid Flow Peaks.

7. The method of claim 1 wherein a band pass filtered portion of the signal from said sensor is used to directly determine area of the Liquid Flow Peak.

8. The method of claim 1 where processing of the vibrational signal is performed adjacent to each nozzle.

9. The method of claim 1 wherein all determinations are carried out using the square root of the area so that said monotonically increasing relationship is approximately a straight line.

10. The method of claim 1 using the height (RMS peak) of the Liquid Flow Peak.

11. The method of claim 1 using the magnitude of the area of the Liquid Flow Peak.

* * * * *